US012614214B2

(12) United States Patent
Jacobs

(10) Patent No.: US 12,614,214 B2
(45) Date of Patent: *Apr. 28, 2026

(54) DYNAMIC PROMOTIONAL LAYOUT MANAGEMENT AND DISTRIBUTION RULES

(71) Applicant: Sanderling Management Limited, Tortola (VG)

(72) Inventor: Michael Jacobs, Hod-HaSharon (IL)

(73) Assignee: Sanderling Management Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 19/358,261

(22) Filed: Oct. 14, 2025

(65) Prior Publication Data

US 2026/0038006 A1      Feb. 5, 2026

Related U.S. Application Data

(63) Continuation of application No. 19/040,746, filed on Jan. 29, 2025, now Pat. No. 12,469,053, which is a
(Continued)

(51) Int. Cl.
*G06Q 30/00* (2023.01)
*G06F 3/04817* (2022.01)
(Continued)

(52) U.S. Cl.
CPC ..... *G06Q 30/0276* (2013.01); *G06F 3/04817* (2013.01); *G06F 3/0482* (2013.01);
(Continued)

(58) Field of Classification Search
CPC .............. G06Q 30/0276; G06Q 30/02; G06Q 30/0613; G06Q 30/0643; G06Q 50/01;
(Continued)

(56) References Cited

U.S. PATENT DOCUMENTS 8,316,450 B2 * 11/2012 Robinson ............... G06Q 30/02
726/26
8,752,111 B2 * 6/2014 Roberts .................. H04N 21/84
725/138
(Continued)

OTHER PUBLICATIONS

"A study on integrated mobile service using digital watermark for various information carriers", by Manabu Hirakawa and Junichi Iijima, 2011 10th International Conference on Mobile Business, IEEE, 2011 (Year: 2011).*
(Continued)

*Primary Examiner* — Anne M Georgalas
(74) *Attorney, Agent, or Firm* — Klintworth & Rozenblat LLP

(57) ABSTRACT

Systems, methods and computer readable products are provided for enabling dynamic loading of one or more digital image branding functions associated with one or more distribution rules. A distribution rule is used to target a group of end users that are selected from a dataset mapping a plurality of end-users according to one or more distribution rules. Instructions are forwarded to present an indication the digital image branding function to each member of the end users group.

30 Claims, 15 Drawing Sheets

Related U.S. Application Data continuation of application No. 17/546,152, filed on Dec. 9, 2021, now Pat. No. 12,248,967, which is a continuation of application No. 17/517,774, filed on Nov. 3, 2021, now Pat. No. 12,086,838, which is a continuation of application No. 17/392,287, filed on Aug. 3, 2021, now Pat. No. 12,100,026, which is a continuation of application No. 16/166,243, filed on Oct. 22, 2018, now Pat. No. 11,127,051, which is a continuation of application No. 15/459,010, filed on Mar. 15, 2017, now Pat. No. 10,108,986, which is a continuation of application No. 15/165,043, filed on May 26, 2016, now Pat. No. 9,639,866, which is a continuation of application No. 14/817,379, filed on Aug. 4, 2015, now Pat. No. 9,355,412, which is a continuation of application No. 14/327,670, filed on Jul. 10, 2014, now Pat. No. 9,123,074, which is a continuation of application No. PCT/IL2014/050032, filed on Jan. 13, 2014.

(60) Provisional application No. 61/757,277, filed on Jan. 28, 2013.

(51) Int. Cl.

| | |
|---|---|
| *G06F 3/0482* | (2013.01) |
| *G06F 3/04845* | (2022.01) |
| *G06Q 30/02* | (2023.01) |
| *G06Q 30/0241* | (2023.01) |
| *G06Q 30/0601* | (2023.01) |
| *H04L 51/52* | (2022.01) |
| *H04W 4/029* | (2018.01) |

(52) U.S. Cl.
CPC ......... *G06F 3/04845* (2013.01); *G06Q 30/02* (2013.01); *G06Q 30/0613* (2013.01); *G06Q 30/0643* (2013.01); *H04L 51/52* (2022.05); *H04W 4/029* (2018.02)

(58) Field of Classification Search
CPC .............. G06F 3/04817; G06F 3/0482; G06F 3/04845; H04L 51/52; H04W 4/029
See application file for complete search history.

(56) References Cited

U.S. PATENT DOCUMENTS

| | | | | |
|---|---|---|---|---|
| 8,983,497 B2* | 3/2015 | Ziskind | .............. | G06Q 30/0205 |
| | | | | 455/456.2 |
| 9,099,152 B2* | 8/2015 | Marcus | .............. | H04N 21/4182 |
| 9,459,778 B2* | 10/2016 | Hogeg | ............. | H04N 21/23418 |
| 9,497,496 B1* | 11/2016 | Corley | .............. | H04N 21/2225 |
| 10,192,244 B2* | 1/2019 | Athsani | .................. | G06Q 40/00 |
| 2008/0252527 A1* | 10/2008 | Garcia | ...................... | G01S 1/68 |
| | | | | 342/450 |
| 2012/0078691 A1* | 3/2012 | Tsai | ...................... | G06Q 30/02 |
| | | | | 715/723 |
| 2013/0073389 A1* | 3/2013 | Heath | ................... | G06Q 30/02 |
| | | | | 705/14.54 |

OTHER PUBLICATIONS

"A Location-based Mobile Advertisement Publishing System for Vendors," by Chyi-Ren Dow, Yu-Hong Lee, Jeremy Liao, Hao-Wei Yang, and Wei-Luen Koo, 2011 Eighth International Conference on Information Technology: New Generations, IEEE, 2011 (Year: 2011).*

\* cited by examiner

102

480 BEGIN

482 RECEIVING A DIGITAL IMAGE BRANDING FUNCTION ASSOCIATED WITH ONE OR MORE DISTRIBUTION RULES.

484 MATCHING A GROUP OF END USERS ACCORDING TO ONE OR MORE DISTRIBUTION RULES.

486 FORWARDING INSTRUCTIONS TO PRESENT AN INDICATION OF THE IMAGE BRANDING FUNCTION TO EACH MEMBER OF THE GROUP.

488 END

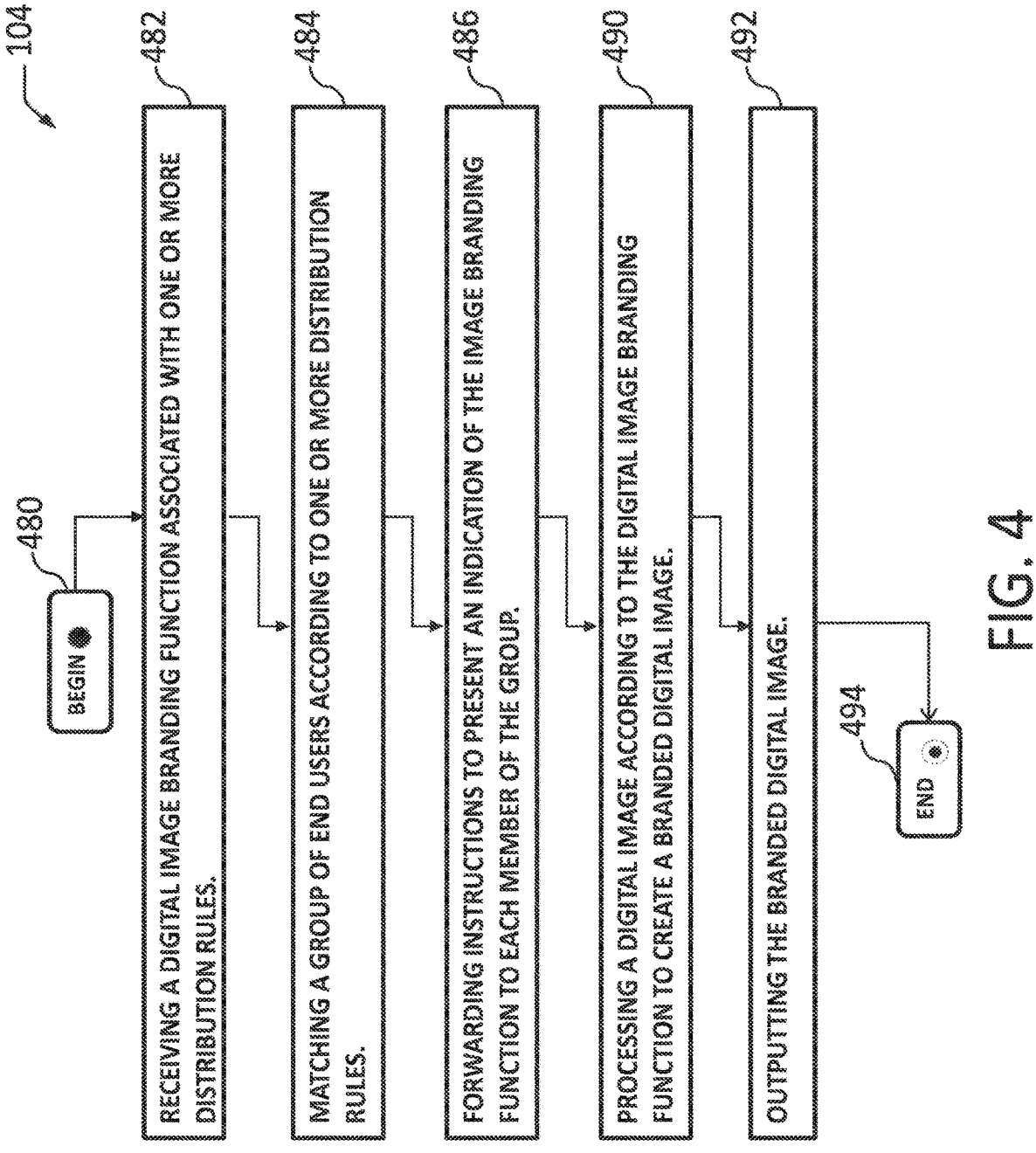

104

480

BEGIN

482 RECEIVING A DIGITAL IMAGE BRANDING FUNCTION ASSOCIATED WITH ONE OR MORE DISTRIBUTION RULES.

484 MATCHING A GROUP OF END USERS ACCORDING TO ONE OR MORE DISTRIBUTION RULES.

486 FORWARDING INSTRUCTIONS TO PRESENT AN INDICATION OF THE IMAGE BRANDING FUNCTION TO EACH MEMBER OF THE GROUP.

490 PROCESSING A DIGITAL IMAGE ACCORDING TO THE DIGITAL IMAGE BRANDING FUNCTION TO CREATE A BRANDED DIGITAL IMAGE.

492 OUTPUTTING THE BRANDED DIGITAL IMAGE.

494 END

FIG. 4

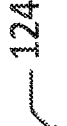
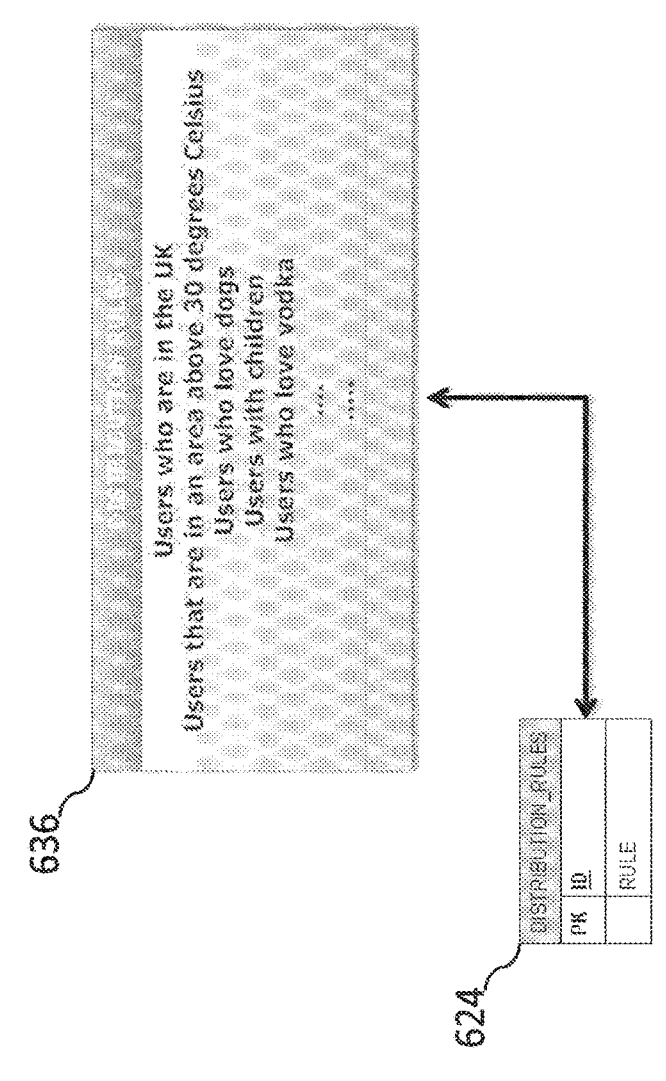
Users who are in the UK
Users that are in an area above 30 degrees Celsius
Users who love dogs
Users with children
Users who love vodka
DISTRIBUTION_RULES
| PK | ID |
|----|------|
|    | RULE |
636
624
124
FIG. 14

DYNAMIC PROMOTIONAL LAYOUT MANAGEMENT AND DISTRIBUTION RULES

RELATED APPLICATIONS

This application is a continuation of U.S. patent application Ser. No. 19/040,746 filed on Jan. 29, 2025, which is a continuation of application Ser. No. 17/546,152, filed on Dec. 9, 2021, now U.S. Pat. No. 12,248,967, which is a continuation of application Ser. No. 17/517,774, filed on Nov. 3, 2021, now U.S. Pat. No. 12,086,838, which is a continuation of application Ser. No. 17/392,287, filed on Aug. 3, 2021, now U.S. Pat. No. 12,100,026, which is a continuation of application Ser. No. 16/166,243, filed on Oct. 22, 2018, now U.S. Pat. No. 11,127,051, which is a continuation of application Ser. No. 15/459,010, filed on Mar. 15, 2017, now U.S. Pat. No. 10,108,986, which is a continuation of application Ser. No. 15/165,043, filed on May 26, 2016, now U.S. Pat. No. 9,639,866, which is a continuation of application Ser. No. 14/817,379, filed on Aug. 4, 2015, now U.S. Pat. No. 9,355,412, which is continuation of application No. Ser. No. 14/327,670, filed on Jul. 10, 2014, now U.S. Pat. No. 9,123,074, which is a continuation of application No. PCT/IL2014/050032, having International Filing Date of Jan. 13, 2014, which claims the benefit of priority of U.S. Provisional Ser. No. 61/757, 277 filed on Jan. 28, 2013. The contents of the above applications are all incorporated by reference as if fully set forth herein in their entirety.

FIELD AND BACKGROUND OF THE INVENTION

The present invention, in some embodiments thereof, relates to promotional content distribution and, more specifically, but not exclusively, to systems, methods and a computer program product for dynamic promotional layout and image processing functions management and/or distribution.

The design and development of mobile device applications for use by end users partaking in social media network conversations has experienced a significant growth in the past decade. This was stimulated in part by an increase in client-terminal computing power and by end-user accessibility to large-scale non-volatile storage, which facilitated the near real-time efficient long term storage of socially related digital images.

These contemporary advances may facilitate the technological underpinning for taming user-driven experiences. For instance, template-based face detection and feature extraction techniques may be readily realized on a client-terminal such as an entry level Smartphone.

A client terminal owned by an end user may be utilized for capturing digital images of people or experiences at social, cultural, sporting or other events. Client terminals with integrated cameras or image sensors are widely used by children and adults. This is in view of the fact that inexpensive image sensors and image processing software became readily available to mobile device manufactures.

Images and videos captured by integrated cameras may be stored locally in the mobile device and/or persisted via an application program interface (API) to remote repositories and/or transmitted via a network to a remote server for further processing.

Socially related video data created and posted to websites by end users such as internet users and bloggers alone, per diem, surpasses the terabyte range and is projected to grow exponentially. To illustrate, according to a study conducted by Martin, (*The Third Screen: Marketing to Your Customers in a World Gone Mobile*, ISBN 10:1857885643) in more than seventy five countries, the number of mobile devices already surpasses the country's population.

For that reason, resellers and merchandisers interested in expanding their market share and increasing their exposure to potential end users quickly recognized the prospective marketing potential of social media networks and strategic brand management.

For instance, one such brand management strategy is generating analytics based on measurements and statistics of geo localized client terminal usage in a social media network, in order to target a particular end user group. Strategies for profiting from embedding coupons, into images quickly emerged: such promotional content came in a variety of assorted forms including banners and sponsored links.

As used herein, the term near real time refers to a time interval of few seconds or less. For instance, the time interval that passes in response to a first triggering event and to the activation time of a subsequent second event.

SUMMARY OF THE INVENTION

According to some embodiments of the present invention, there is provided a computerized method of distributing a digital image branding function, the computerized method comprising:

receiving the digital image branding function associated with at least one distribution rule;

matching, using a processor, a group of end users selected from a dataset mapping a plurality of end users according to the at least one distribution rule; and forwarding instructions to present an indication of the image branding function to each member of the group, the indication is presented on a display of a client terminal associated with the member; and wherein the image branding function is set to process a digital image designated at the client terminal to create a branded digital image.

Optionally, wherein the image branding function is an image layout branding function that is set to embed a graphical.

Optionally, wherein the distribution rule is a distribution rule targeting at least one member of at least one member's group of at least one social media network.

Optionally, wherein the image branding function is a content processing function that analyzes a content depicted in the digital image to create accordingly the branded digital image.

Optionally, further comprising:

receiving, at a matching module, current data metrics from at least one sensor on the client terminal;

in response to the receiving, matching by a matching module, the current data metrics to a second distribution rule; and forwarding the second distribution rule to each member of the group.

Optionally, wherein a plurality of image branding functions are cascaded thereby creating the image branding function.

Optionally, wherein the at least one sensor is at least one of an image sensor, an accelerometer, a gyroscope, a location determining device, light sensor, temperature sensor, blood rate monitor, heart rate monitor, and moisture sensor.

Optionally, further comprising:

processing a digital image designated by the member at the client terminal according to the image branding function to create a branded digital image; and outputting the branded digital image.

Optionally, further comprising rewarding each the member of the group of end users with at least one monetary reward in response to distributing the branded digital image to at least one social media network by each the member of the group of end users.

Optionally, wherein a measure of the at least one monetary reward is a frequency at which at least one member of at least one social media network members group responds to the distributing of the branded digital image.

Optionally, further comprising enabling end users to order at least one paid personalized gift from at least one physical fulfillment service thereby allowing printing of the branded digital image on the at least one paid personalized gift.

According to some embodiments of the present invention, there is provided a computerized system of distributing an image branding function, comprising:

a database which documents a plurality of image branding functions each of the plurality of image branding functions is associated with at least one distribution rule;

a processor;

a matching module which matches, using the processor, to a first of the plurality of image branding functions a group of end users selected from a dataset mapping a plurality of end users according to a respective the at least one distribution rule;

a network interface which forwards instructions to present an indication of the first of the plurality of image branding functions to each member of the group, the indication is presented on a display of a client terminal associated with the member; and an image processing module which processes a digital image designated by the member at the client terminal according to the image branding function to create a branded image and outputs the branded image.

According to some embodiments of the present invention, there is provided a client terminal used by an end user, the client terminal comprising:

an image sensor for capturing at least one digital image;

a processor;

a memory including computer program code for one or more programs, the memory and the computer program code configured to, with the processor, cause a resident application executing on the client terminal to perform at least the following:

initiate presentation of a graphical user interface (GUI) on the client terminal;

receive at least one image branding function displayed on a first palette in a first area on the GUI;

capture using the image sensor, at least one digital image displayed on a second palette in a second area on the GUI;

identify at least one region of interest within the at least one digital image; apply at least one image branding function to the at least one region of interest thereby transforming the at least one digital image to at least one branded digital image; and output the branded digital image.

Optionally, further comprising:

provide the end user, access to a dataset comprising at least one image processing function in a third area displaying a third palette, select by the end user, at least one of the at least one image processing function; and in a forth area displaying a button which when clicked by the end user, applying the at least one of the at least one image processing function to at least one of the at least one digital image, thereby displaying in a fifth area, a group of at least one branded digital image to the end user.

Optionally, wherein the receiving further comprising:

accessing a third party image sharing service which provides at least one image filter; and unifying the at least one image branding function with the at least one image filter.

Optionally, further comprising:

receive by the resident application, current data metrics from at least one sensor attached to the client terminal; and in response to the receiving, modify the image branding function.

Optionally, wherein in the outputting, the at least one branded digital image is in a Joint Photography Engineering Group (JPEG) image format associated with an exchangeable image file format 'EXIF' attachment, wherein 'EXIF' attachment comprises at least one of time and date, location, a campaign reference id, device type, an end user ID and end user details.

Optionally, wherein to a first client terminal establishes near field communications (NFC) with a second client terminal thereby allowing a first end user of the first client terminal to transmit at least one resident application to a second end user of the second client terminal.

Optionally, wherein the image processing function is at least one of de blurring, color correction, auto focus, fill flash, cropping, de motion blurring, black and white, sepia, antique, overlay, pinch, zoom and rotation.

Optionally, further comprising:

accessing a third party image sharing service which provides at least one image filter;

forwarding by the resident application the at least one image branding function to the third party image sharing service; and in response to the forwarding, unifying by the third party image sharing service the at least one image branding function with the at least one image filter.

According to some embodiments of the present invention, there is provided a computer program product comprising a non transitory computer usable storage medium having computer readable program code embodied in the medium for distributing an image branding function, the computer program product comprising:

first computer readable program code for enabling a processor to receiving a digital image branding function associated with at least one distribution rule;

second computer readable program code for enabling a processor to matching, a group of end users selected from a dataset mapping a plurality of end users according to the at least one distribution rule;

third computer readable program code for enabling a processor to forwarding instructions to present an indication of the image branding function to each member of the group, the indication is presented on a display of a client terminal associated with the member;

forth computer readable program code for enabling a processor to processing a digital image designated by the member at the client terminal according to the digital image branding function to create a branded digital image; and fifth computer readable program code for enabling a processor to outputting the branded digital image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a flowchart of a method of distributing a digital image branding function and processing a digital image, according to some embodiments of the present invention;

FIG. 14 is an illustration of an exemplary distribution rules database entry, according to some embodiments of the present invention.

DESCRIPTION OF SPECIFIC EMBODIMENTS OF THE INVENTION

Figure 1:
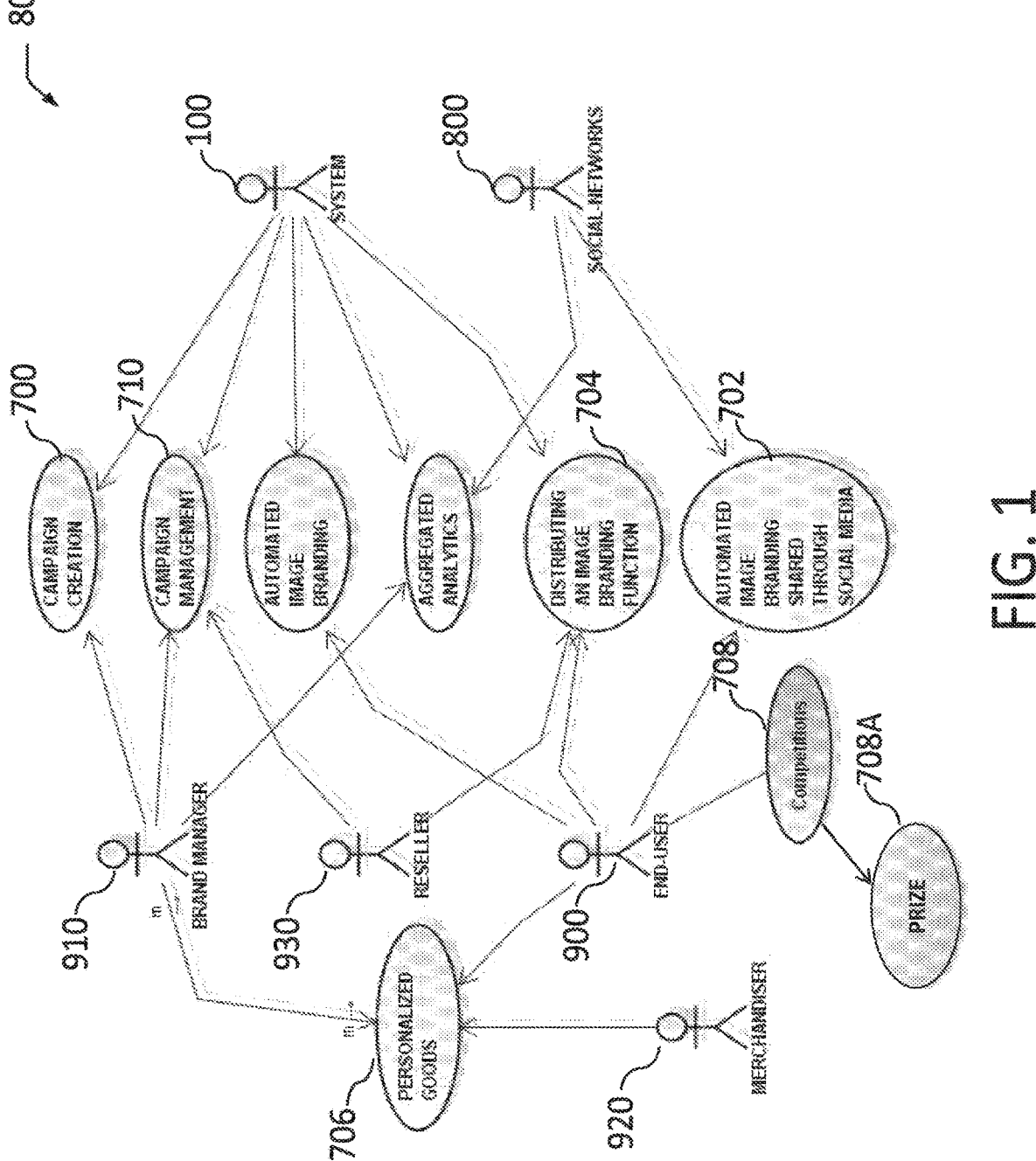
FIG. 1 is a unified modeling language (UML) use case diagram of an exemplary image branding function distribution system, according to some embodiments of the present invention.

The present invention, in some embodiments thereof, relates to promotional content distribution and, more specifically, but not exclusively, to systems, methods and a computer program product for dynamic promotional layout and image processing functions management and/or distribution.

In some embodiments of the present invention, the systems, computer program products and methods enable dynamic loading, for instance, at a client terminal, one or more digital image branding functions. An image branding function is a function that when applied to a digital image processes the image by applying a transformation according to the function. For instance, applying a function that adds an icon or that alters the digital image layout and/or the like. An image branding function may be associated with one or more distribution rules. A distribution rule is a rule used in determining how to target a group of end-users, for instance, a rule that determines that only a group of end users having certain characteristics and/or match a certain requirement, for example currently watching a specific content via their client terminal, for example a soccer game, are associated with the image branding function. It should be noted that the one or more distribution rules may be altered in real-time, by an administrator such as a brand manager, based on the state of various relevant conditions such as the location of end users as described in detail hereinbelow.

One or more indications of the digital image branding function(s) may be displayed by a client terminal, in a graphical palette, allowing the user to select a digital image branding function for processing a selected or captured image in real time.

Digital image branding functions may be distributed according to one or more distribution rules, end users having specific demographic characteristics, located in a certain area, optionally at a certain time, using a certain application that is installed in their client terminal and/or the like.

Processing a digital image designated by the member at the client terminal according to the selected digital image branding function results in a branded digital image. The branded digital image may be processed by an image processing filter, such as a Gaussian smoothing function. The end user who created the branded digital image using the digital image branding function is optionally presented with the option to share the branded digital image with his friends in a social media network and/or to post the branded digital image in a digital billboard.

Optionally, an image branding function is matched to a group of end users from a database according to relation to an event, a socially connected group of end users and/or the like. In such embodiments, instructions to present an indication of the image branding function are sent to client terminal of one or more members of the group.

According to some embodiments of the present invention, there is provided a system that allows a brand manager to create, retrieve, aggregate, organize, analyze and/or distribute one or more image branding functions, for example as part of a campaign. The system allows end users to interact with a brand and to be involved actively in a creation of an image that includes the brand.

Brand managers may leverage end user generated content for the purpose of brand and/or product promotion.

As used herein, the term user generated content refers to any type of data that is typically created on a client terminal. For instance, graphical data, including but not limited to digital images, photos, graphics, drawings, paintings, pictures, videos, images extracted from videos, information related to the photos and/or the videos and/or a combination thereof. For instance, audio and speech, including but not limited to, voice(s), singing, background sounds, and/or playing musical instruments.

The system may allow a brand manager to grant monetary and/or non-monetary reward to certain end users, for instance based on the distribution of the branded digital images he created, for example by counting the number of times other end users responded to and/or viewed post(s) with the branded digital images.

The system may allow a brand manager to enable end users to purchase paid personalized gifts, based on data metrics collected on the end user's client terminal and subsequently allow the end user to commercially engage with a physical fulfillment service.

We now present for the purpose of subject matter introduction and by way of example only, and not limitation, the exemplary use case diagram of FIG. 1.

In FIG. 1 the UML notation is utilized in order to present use case models and actors interacting with the use case models, according to some embodiments of the present invention. As used herein, the term actor refers to a role played by a human user or a component.

Referring now to FIG. 1 which is a use case diagram 80 of an exemplary image branding function distribution system, according to some embodiments of the present invention.

Campaign management and branding systems such as system 100, allow brand manager 910 to segment end users 900 each having a client terminal (not shown) into targeted end user groups using one or more distribution rules. The system 100 may allow a brand manager to distribute personalized content such as a branded application having a custom made visual appearance (skin) and/or a digital image branding function, to the targeted end user groups using the one or more distribution rules.

The system 100 may allow branding campaigns to be executed partly simultaneously, or in overlapping periods according to parameters such as campaign duration, configured in the system 100 by a brand manager during a campaign creation 700 processes.

As used herein, the term client terminal refers to any network connected device including, but not limited to, personal digital assistants (PDAs), tablets, electronic book readers, handheld computers, cellular phones, personal media devices (PMDs), smart phones, and/or the like.

The client terminal may be used to host and execute one or more resident applications which initiate presentation of a graphical user interface (GUI) on the client terminal. The client terminal may also be used to accept input entered by an end user, to display information such as a branded image, to apply image processing functions such as sharpening, and/or to participate in campaign competitions, as described below.

The system 100 may allow different actors such as the brand manager 910, to interact, in a campaign creation 700 process, with the system 100 and with the end user 900 in order to distribute an image branding function 704 to end user 900. The system 100 may also allow the end user 900 to automate the process 702 of image branding, and/or share branded images to social networks 800 such as Facebook. The system 100 may be in addition utilized in order to:

I. Change, remove or promote in real time branded skins to end users either targeting end users participating in the campaign or targeting end users at least one specific geographic location.

II. Assign, increase or decrease the number of end users receiving a specific branded skin.

III. Utilize the proactive transmission of notifications to a selected group of end users. Manage promotions, competitions and incentives for use by a targeted group of end users.

IV. Censure and moderate digital images forwarded to the system by end user.

V. Shorten or extend the duration of one or more campaigns.

VI. Generate detailed end user analytics such as analytics based on end user usage of branded images and/or analytics based on data metrics relevant to quantifying campaign effectiveness.

The system 100 may be part of a photo marketing platform targeted predominantly to address the business needs of the brand manager 910, for instance, in configuring the various components of a strategic marketing program, in presenting aggregated analytics, and/or in establishing the relationships between a merchandiser 920 and a reseller 930.

Optionally, the system 100 may include an administrative console and/or a user interface such as a campaign management web interface (refer for instance to numeral 912 of FIG. 2) that allows the brand manager 910 to manage resources such as a merchant/reseller catalog, promotional content, branded image functions and/or the like.

The system may allow a brand manager 910, who is the marketing executive responsible for creating a campaign, to configure additional parameters pertaining to the campaign such as an objective of reaching a minimum number of end users, scheduling campaign delivery, coming up with the content of the campaign and/or establishing costs associated with maintaining the campaign.

The system 100 may also be used by a reseller 930 such as a marketing agency, or one acting as a channel partner, such as one that operates several campaigns in tandem each targeted to address the requirement of a different client.

The system 100 may also be used by the merchandiser 920, such as a supplier of goods personalized with the use of a branded image.

Once a campaign is created, the system 100 may allow the participation of various end user types. An end user 910 may be an anonymous end user or participant, such as a user who downloads a branded application to a client terminal, a registered end user or participant, such as a user who signs up to a service offered by the system 100 by creating an account. Optionally, the system 100 supports several revenue generating models. The system 100 may enable the end user 910 to purchase personalized goods 706, which are be offered by the merchandiser 920 and marketed by the reseller 930 through the distribution of promotional content such as a coupon.

As used herein, the term promotional content refers to any category of content which conveys information relating to a promotional, commercial, marketing, or monetary prospect of which one or more users may financially benefit from. Consequently, promotional content may contain, for instance, commercial recommendations, offers, coupons, discounts, subsidized products, marketing materials, and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non exhaustive list) of the computer readable storage medium would include the following: an electrical connection having one or more wires, a portable computer diskette, a hard disk, a random access memory (RAM), a read only memory (ROM), an erasable programmable read only memory (EPROM or Flash memory), an optical fiber, a portable compact disc read only memory (CD ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
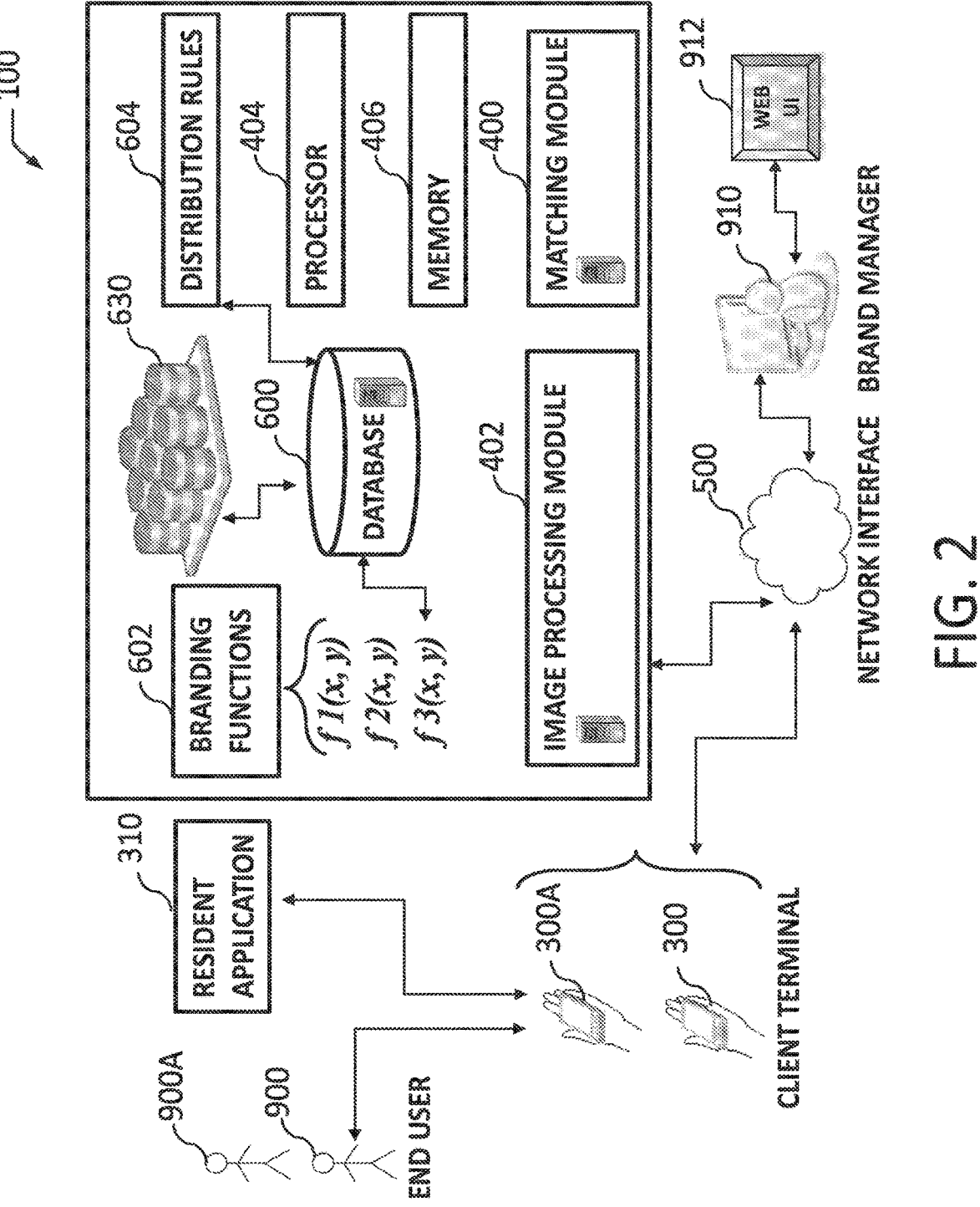
FIG. 2 is an exemplary block diagram illustrating elements of a system of image branding function distribution, according to some embodiments of the present invention.

Referring now to FIG. 2 which is an exemplary block diagram illustrating elements of a system 100 of image branding function distribution, according to some embodiments of the present invention.

The system 100 includes: a processor 404, a memory 406, a matching module 400, an image processing module 402, a network interface 500 and a campaign management database 600.

Under some embodiments of the present invention, the processor 404 is located within or outside the system 100. Further, while certain components are illustrated within the system 100, those with ordinary skill in the art would appreciate that the modules illustrated in FIG. 2 may be arranged differently.

For instance, the system 100 and/or one or more of the system 100 components, are located within a cloud computing environment (not shown) or are contained entirely within one of the other modules, such as the matching module 400 and/or the image processing module 402. In like manner, while in FIG. 2 a single system 100 having a single processor 404, and single memory 406 is illustrated and discussed, those with ordinary skill in the art would appreciate that several such systems may be utilized having different permutation and number of the modules.

The processor 404 and/or the memory 406 may be coupled, directly or indirectly, through a system bus (not shown) or any alternative communication structure to one or more modules such as the image processing module 402, the campaign management database 600 and/or peripheral devices.

Optionally, the processor 404, the memory 406 and/or campaign management database 600 are directly or indirectly connected to additional storage device, such as a hard disk array storage device 630 which is external to the system. The matching module 400 and the image processing module 402 may be communicably coupled to the campaign management database 600 and communicably connected to a network via a network interface 500.

Under some embodiments of the present invention, the digital images, end user profile data and/or campaign configuration data are stored in the campaign management database 600. The source of the digital images may be, photographs captured by end users 900 and end user 900A who are external to the system and are using client terminal 300 and client terminal 300A respectively. The client terminal 300 may host one or more resident applications 310 which are used to interact with end users as described in detail hereinafter.

As used herein, the term network refers generally to any type of telecommunications or data network including, without limitation, hybrid fiber coax (HFC) networks, satellite networks, telecommunications networks, and data networks including local area networks (LANs), metropolitan area networks (MANs), local area networks (LANs) and/or wide area networks (WANs), the Internet, and intranets.

As used herein, the term module refers to any computerized component, network node or entity adapted to provide communications protocols and/or applications and/or content and/or other services to one or more client terminals, other devices or entities on a network or a remote network node.

The campaign management database 600, stores and documents the image branding functions 602. Each of the image branding functions 602 may be associated with one or more distribution rules 604.

For instance, the distribution rule 604 may be a rule targeting a group of end users who are in the connections list of an end user in a social media network. The distribution rules 604 may be stored in the campaign management database and may be altered in near real time by the brand manager 910, who is external to the system 100, thereby reflecting a change in campaign distribution strategy.

A matching module 400, matches a group of end users selected from a dataset mapping a plurality of end users to an image branding function according to a respective distribution rule 604.

The network interface 500 forwards instructions sent by the system 100 to present an indication of a digital image branding function 602, for instance, on a graphical palette on the display of an end user client terminal. A digital image branding function 602 may be subsequently applied to one or more digital images captured by the end user and shared through social media networks. The image branding function 602 may also be stored in the campaign management database and may be altered in near real time by the brand manager 910.

The image processing module 402 processes a digital image selected by an end user according to an image branding function, or according to an image processing function in order to create a branded image and consequently output the branded digital image for post processing. For instance, the user opts to apply an image post processing function such as an image sharpening function as described in detail hereinbelow. In like manner, the image processing module 402 automatically applies a branding function that adds an icon or that alters the digital image layout and/or the like.

It should be noted that system 100 and/or any of its components may be integrated with third party vendors and services such as services offered by Facebook, Twitter, flikr, Pinterest, FourSquare, Instagram, email, any combination thereof and/or the like.

For instance, system 100 is integrated with Facebook such that images posted by users are branded according to distribution rules set by system 100.

Or for instance, system 100 is integrated with an image filtering service offered by Instagram such that the Instagram service allows an end user to select a branding function offered by system 100. The end user selects the branding function in the same manner that the end user selects a filter provided by the Instagram image filtering service. Subsequently, the Instagram image filtering service applies the branding functions to one or more digital images captured by the end user. A resident application 310 and/or a third party resident application, may be utilized to allow end users select instagram filters and/or branding functions provided by system 100. In addition, the resident application 310 and/or a third party resident application, may also utilize information received from sensors attached to the client terminal used by the end user, in order to dynamically change the branding functions and/or filters.

Figure 3:
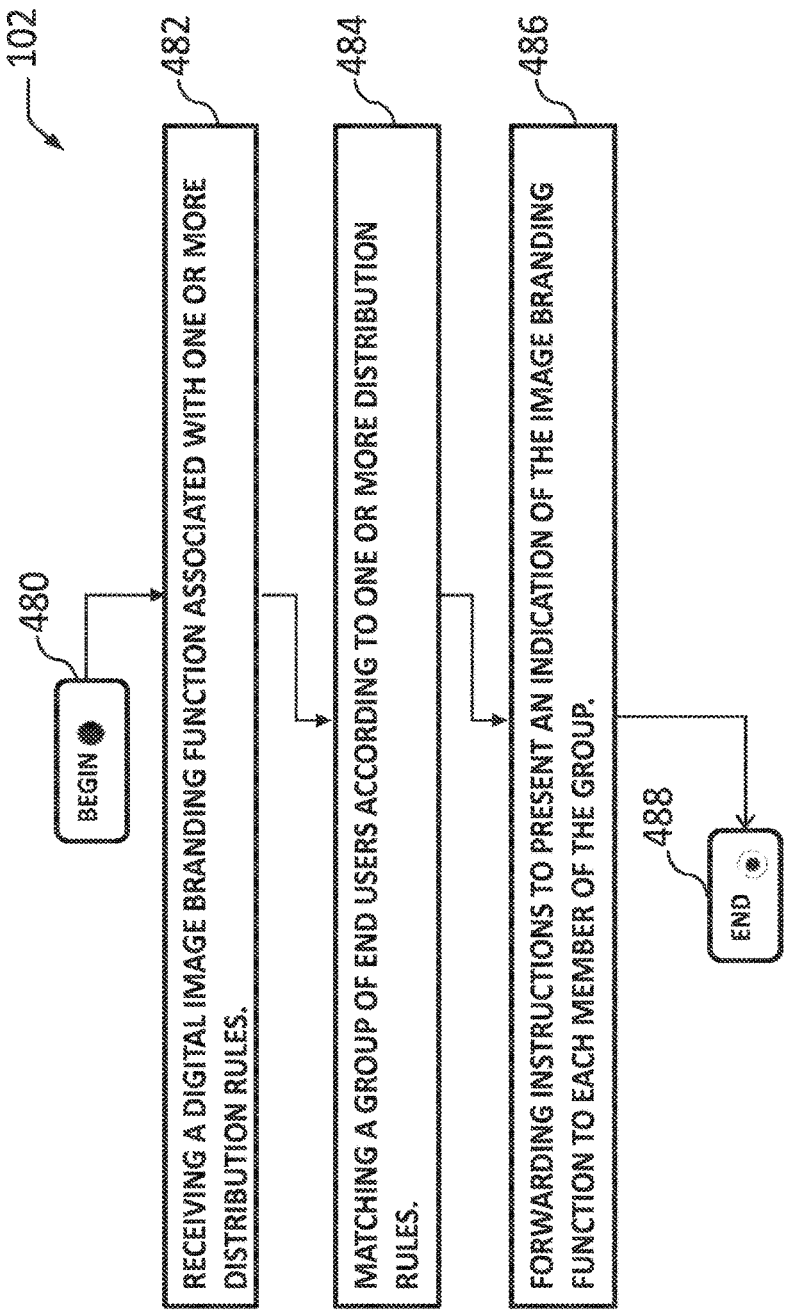
FIG. 3 is a flowchart of a method of distributing a digital image branding function, according to some embodiments of the present invention.

Referring now to FIG. 3 which illustrates a method 102 of distributing a digital image branding function to a group of end users, according to some embodiments of the present invention. The method may be implemented using system 100 that was described in detail hereinabove.

First, the method begins at 480, followed at 482 by receiving, for instance, from system 100, a digital image branding function associated with one or more distribution rules. The digital image branding function may be displayed on a client terminal of one or more end users that are targeted using the distribution rule. For instance, a distribution rule created for running a campaign that is targeted at recruiting engineering students who were awarded a degree with Distinction, from top British universities.

Next at 484, a group of end users from a dataset mapping a plurality of end users is identified as matching for the image branding function, for example according to one or more distribution rules which are associated with the image branding function. The matching may be based on, selecting a group of users from a database, from a membership list of a social media network and/or the like.

At 486, instructions to present an indication of the image branding function are forwarded to each member of the matched group. For example, an indication of the image branding function is added to a graphical palette that is presented on the client terminal of each member of the end users group may be utilized to display the image branding function which may subsequently be selected by each member of the end users group.

Lastly at 488, the method terminates.

Optionally, and with reference to FIG. 4, the digital image is processed and outputted as described hereinafter. FIG. 4 illustrates a method 104 of distributing a digital image branding function to a group of end users, and processing a digital image according to some embodiments of the present invention.

Like the method described in FIG. 3, the method described herein may also be implemented using system 100. Back to FIG. 4, the first four blocks (e.g. 480-486) are identical to the blocks having the same numerals in FIG. 3.

Now at 490, processing a digital image designated by the member at the client terminal according to the digital image branding function selected, resulting in a branded digital image.

Lastly at 492, the method terminates after outputting the branded digital image.

The branded digital image may be further processed by image processing functions and/or shared and distributed as exemplified hereinbelow with reference to FIG. 7.

Figure 5:
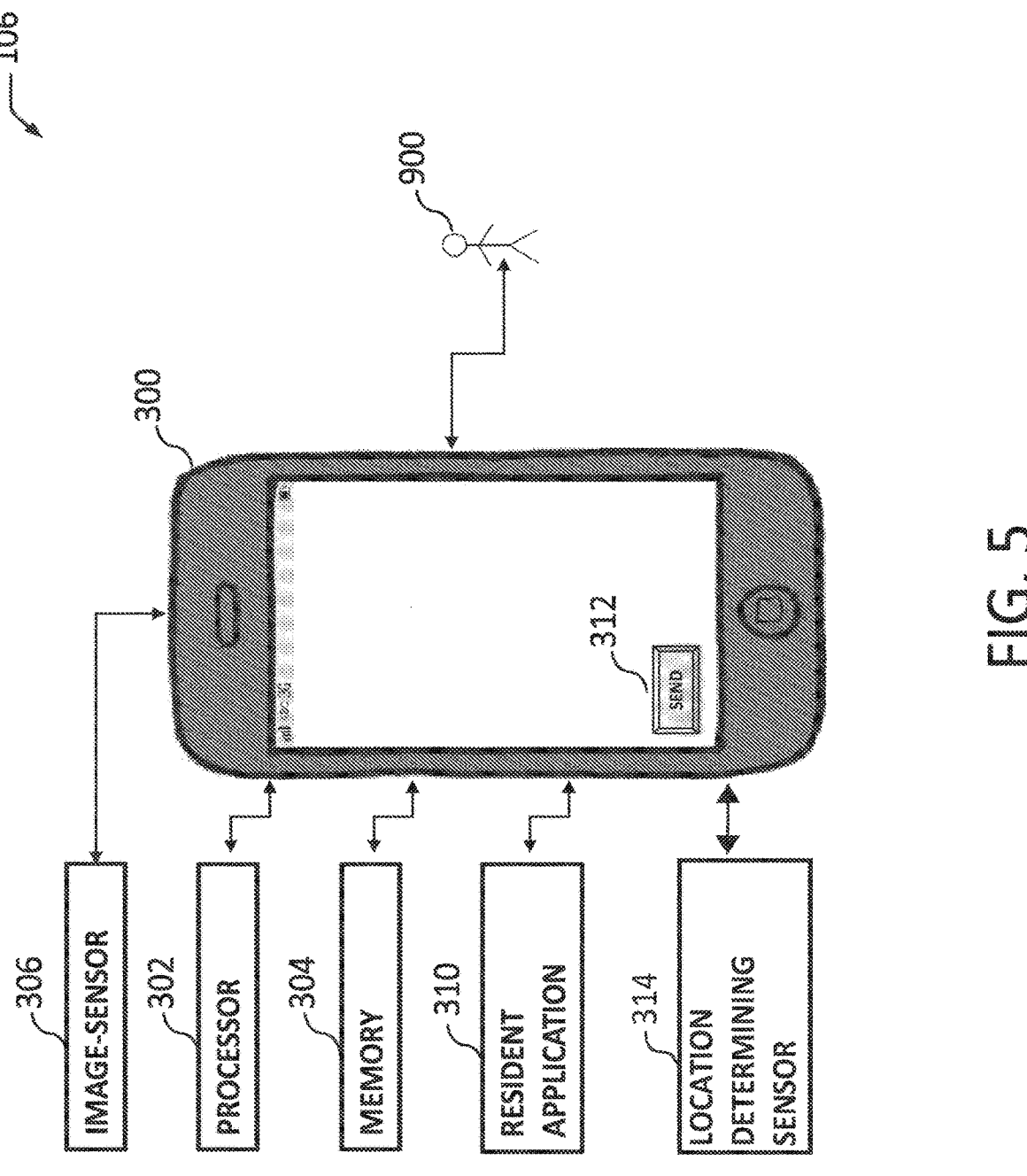
FIG. 5 is a diagram of an exemplary client terminal having graphical user interface (GUI) and a resident application, according to some embodiments of the present invention.

Referring now to FIG. 5, which is a diagram 106 of an exemplary client terminal having graphical user interface (GUI) and a resident application, according to some embodiments of the present invention.

The client terminal 300 may include a processor 302 and a main memory 304, which is communicably coupled to the processor 302. The main memory 304 may store data and executable code, and in addition stores data associated with resident applications 310 running on the client terminal 300.

The client terminal 300 also includes an image sensor 306 for capturing one or more digital images.

The client terminal may output a branded digital image in various image formats and stores, in addition to the branded digital image, additional metadata associated with the branded digital image. For instance, when the digital image output format is a Joint Photographic Experts Group (JPEG) image format, then the digital image is associated with an exchangeable image file format 'EXIF' attachment. The 'EXIF' attachment may comprise metadata such as time and date, location, a campaign reference id that was assigned by a brand manager, device type, an end user ID and/or any additional end user details.

Under some embodiments of the present invention, sensors, such as the image sensor 306 are employed in detecting and/or measuring movements and collecting data metrics. For instance, when a sensor detects that the end user is moving up or down an elevator with his children, the system 100 activates a distribution rule that forwards an image branding function that is related to a paid amusement park roller coaster as part of a photo marketing campaign targeting families in a summer holiday. Or for instance, when a sensor such as an anemometer detects the end user is subject to heavy wind, system 100 activates a distribution rule that forwards an image branding function that is related to coats targeted especially to protect end users against wind.

Data from the sensors may be utilized either in combination, or individually, in whole or in part, to detect and/or measure movements. Consequently, measurements may be determined from joining data obtained from one or more sensors. For instance, data metrics collected from a temperature sensor indicates that the end-user is located in a hot environment. Subsequently, system 100 of FIG. 2 forwards to the end user an image branding function which is associated with a distribution rule that defines as target audience users in a hot environment, for instance an image branding function that adds a label depicting a cold refreshing drink offered by a reseller.

As used herein, the term sensor refers to, but not limited to: an image sensor, an accelerometer, a gyroscope, a location determining device such as a global positioning device (GPS), light sensor, temperature sensor, heart rate monitor, image capturing sensor, moisture sensor, a combination thereof and/or the like.

Under some embodiments of the present invention, the processor 302 provides processing ability in conjunction with the main memory 304 and optionally the permanent storage 306, to host and run one or more resident applications 310. Suitable for long term storage, the permanent storage 306 may store data files such as images, end user preference information and/or the like.

Optionally, the resident application 310, runs on the client terminal 300 and is operable, but is not limited to, capturing, managing, branding and displaying images, gathering input from client terminal sensors, communicating with additional client terminals 300, and/or the like.

Optionally, the resident application 310, initiates presentation of the GUI on the client terminal. The resident application is logic implemented in any combination of hardware and software, is stored in memory and executed by a processor and/or used to accept input entered by an end user and display information such as a branded image.

Optionally, the resident application 310 executes on the client terminal when selected by an end user or executed when triggered by an event, such as an update to the resident application 310.

Optionally, the resident application 310 is used to receive content and other information related to the location of the client terminal and to provide this content to other modules or to the system 100.

Optionally, the GUI and/or one or more of the components comprising the GUI may be dynamically configured and changed in real time according to one or more parameters. For instance, the resident application 310 detects, using a sensor on the client terminal, that the height at which the client terminal is held matches the height of a child end user, and in response, the resident application 310 dynamically alters the GUI so that GUI components such as buttons are larger to ease the operation of the GUI by the child end user.

Optionally, the end user is provided access to a dataset comprising image processing functions, in an area on the GUI displaying a palette with selectable image processing functions. Subsequently, the user may select one or more of the image processing functions from the palette and by clicking a button 312, applying one or more of the image processing functions to one or more digital images. Subsequently, the user may be view the processed images.

Optionally, the resident application provides additional functionality that includes, but is not limited to:

I. Sharing digital images directly from the resident application to social media networks such as Facebook, Twitter, flikr, Pinterest, FourSquare, email, any combination thereof and/or the like. The sharing of digital images may be accomplished by concurrently distributing the digital images to multiple channels by using a service such as Pixelpipe.

II. Utilizing a predetermined fixed footer that is displayed with the shared digital image. The footer may be composed of, for instance, plain text and/or a hyperlink.

III. Allowing a user to comment on one or more digital images. For instance, the user uses the resident application to communicate with a social media network and provide a comment on an image that was uploaded to the social media network by another end-user.

IV. Allowing a user to vote (commonly known as "Like"), for instance in favor of a shared digital image in a social media network.

V. Allowing a user to create a branded album having a personal context, for instance, an album in which all the digital images are automatically branded with a picture of a university an end user is attending.

Figure 6:
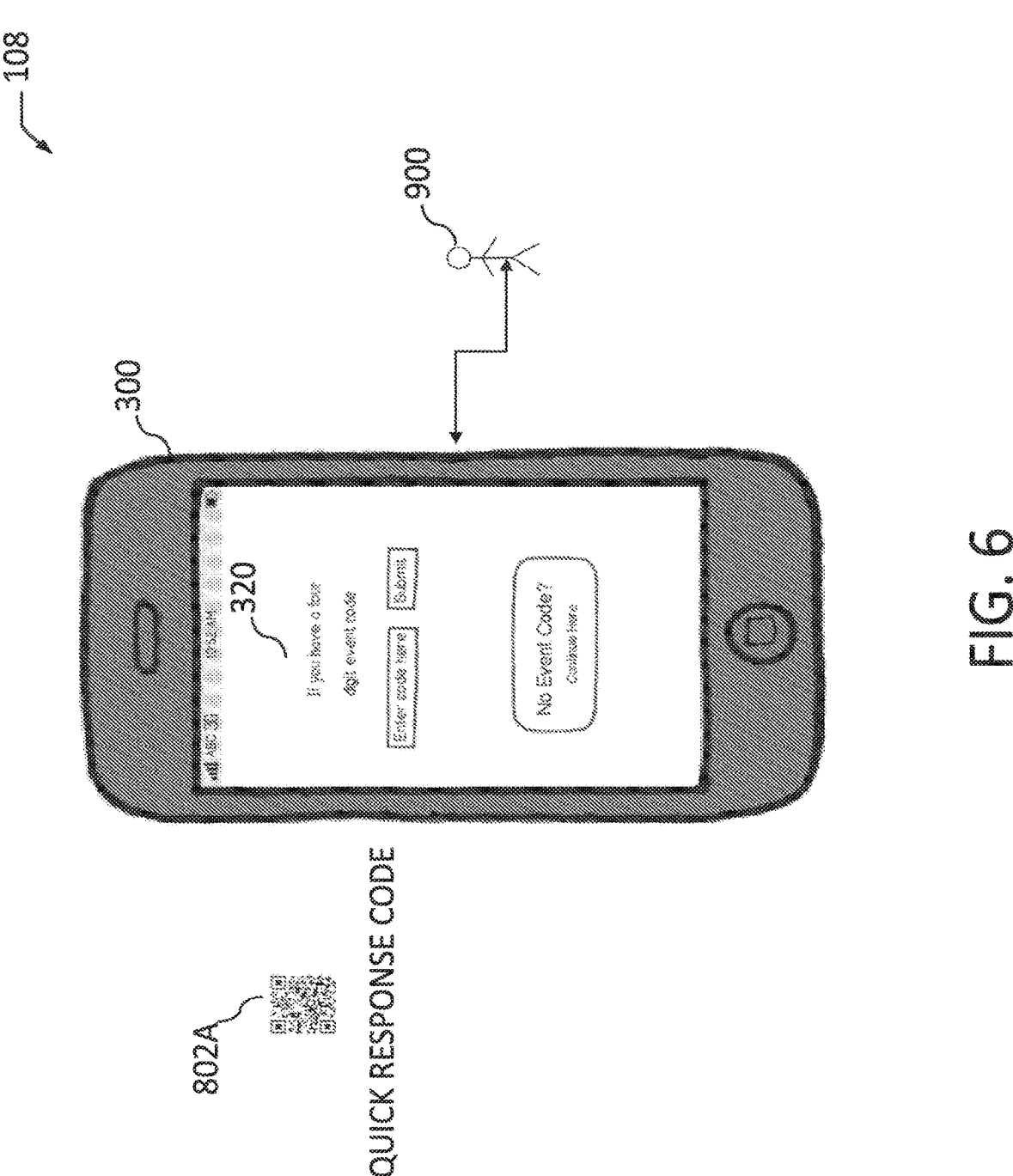
FIG. 6 is an illustration of a resident application awareness process, according to some embodiments of the present invention.

Referring now to FIG. 6 which is an illustration of resident application awareness process 108, according to some embodiments of the present invention.

An end user 900 may become aware of the existence of a resident application by one or more of the following alternative methods: (i) an on-site promotion method in which during a promotional event at a physical location wherein the end-user 900 employees near field communications (NFC) attached to his client-terminal in order to receive a resident application transmitted to him from another NFC enabled device. (ii) An on-line promotion method taking place prior to a promotional event at a physical location. (iii) An on-line promotion as part of an on-line event wherein end-users participate in an on-line (e.g. not physical) promotional event. (iv) A notification based method wherein a proactive push notification including a resident application is transmitted to the client-terminal used by the end-user. It should be noted that the determination whether to send notification may be based on the end-user 900 location, time and/or preferences, (vi) Scanning a quick response code 802A.

We now describe a resident application awareness process using method (vi).

First, the end-user scanners a quick response code 802A, which is associated with a branded resident application.

Next, in response to scanning the quick response code 802A, the end user 900 is presented with a GUI 320 that guides the end by interacting with the end user through a process of downloading one or more resident applications such as the one depicted by numeral 310 of FIG. 5.

Finally, the end-user 900 may use the downloaded resident application in order to capture pictures and brand digital images.

Figure 7:
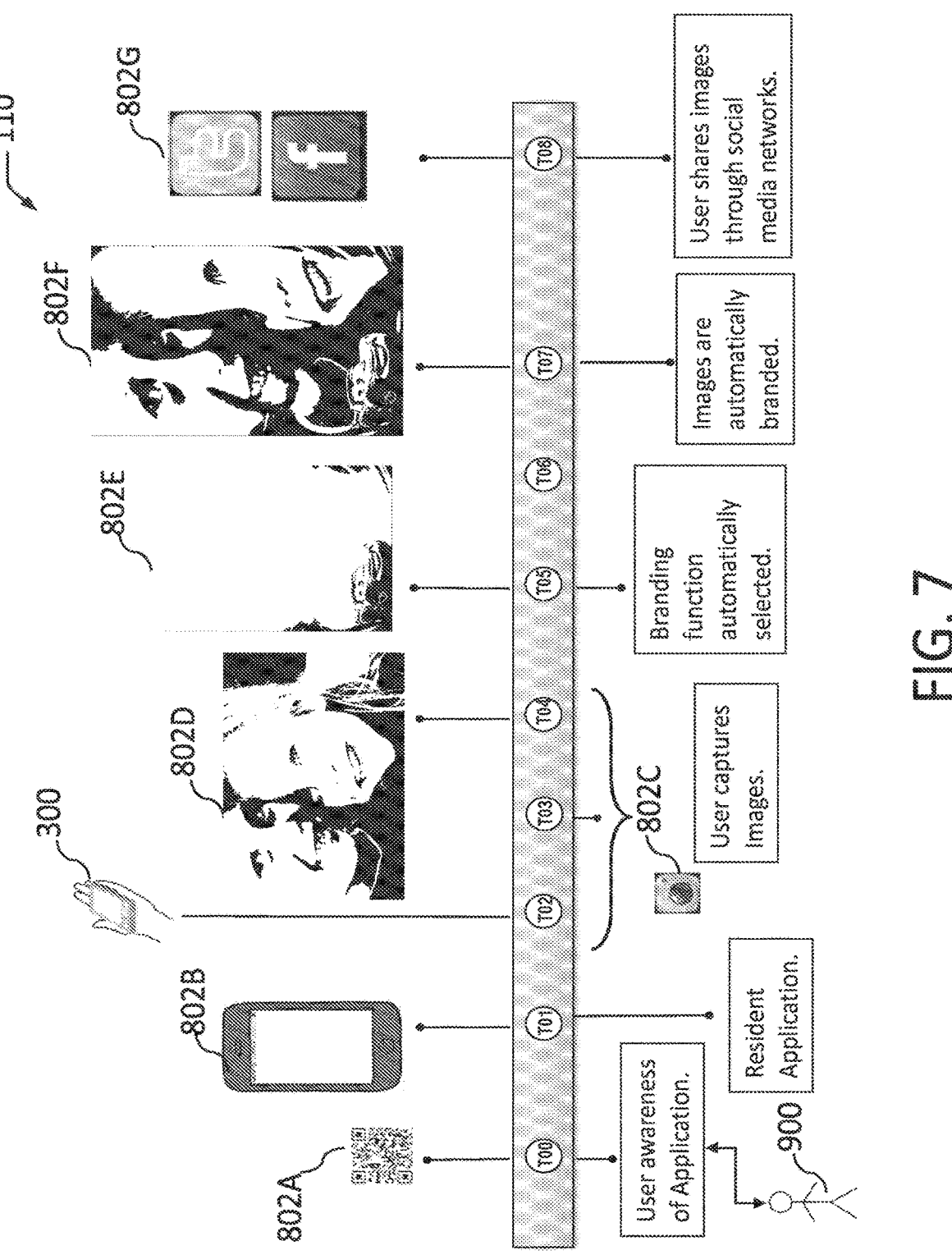
FIG. 7 is a time lagged flowchart illustrating an exemplary sequence of events occurring during a creation of a branded digital image on a client terminal, according to some embodiments of the present invention.

Referring now to FIG. 7 which is a time lagged flowchart 110 illustrating an exemplary sequence of events occurring during a creation of a branded digital image on a client terminal, according to some embodiments of the present invention.

First, the method begins at T00 when end user 900 awareness of a resident application with a branded skin 802B comes to life by introducing the end user 900 with a quick response code 802A that pertains to the resident application.

Next at T01, the end user 900 downloads the resident application.

Next, the end user uses his client terminal 300 and integrated image sensor 802C, at T02 and T03 respectively to capture one or more digital images 802D at T04.

Next at T05 a branding function 802E that is associated with one or more distribution rules is automatically selected. For instance, based on the location of the party 900.

Subsequently at T07 automatic branding of the digital images is conducted thereby resulting in having one or more branded images 802F.

Lastly, at T08, the user may opt for sharing one or more of the branded digital images through one or more social networks 802G. The shared branded digital images may be subsequently monitored by the system 100 using a method described in detail hereinbelow in FIG. 11.

Figure 8:
FIG. 8 illustrates how end user information, such as a location, may be used in order to distribute a personalized branded image function, according to some embodiments of the present invention.

Referring now to FIGS. 1 and 8. FIG. 8 is an illustration 112 of how end user information such as a location, is used in order to distribute a personalized branded image function, according to some embodiments of the present invention.

The system 100 may utilize geo-localized information in order to manage a campaign that targets end users based on their location. In some embodiments of the present invention, the client terminal 300 includes a location determining sensor 314. The location determining sensor 314 may be a GPS utilized in calculating end user location. For instance, the location detecting sensor approximates the geographic location of end users by triangulation as known in the art.

Optionally, the system 100 utilizes geographic segmentation methods to engage end-users in a personalized photo marketing campaign. For instance, system 100 determines that a first end user 900C is located at Highland 1200 in Scotland and that a second end user 900d is located at Aberdeenshire 1202 also in Scotland.

The system 100 may further determine using information queried and extracted from the campaign management database 600, that the first end user 900C and second end user 900D are a U.S based married couple, both of which are working in the distillery business. Using the information gathered so far, system 100 may distribute an image branding function of a Hotel in Scotland offering free guided tours in the Scottish distilleries.

In some embodiments of the present invention there are provided several revenue models (not shown). For instance, in the hereinabove presented example, and referring again also to FIG. 1, the reseller 930 and the merchandiser 920 are the hotel owner and the distillery owners respectively cooperating together in a photo marketing and branding campaign to achieve a certain goal which was set up by the brand manager 910. Or for instance, a brand manager 910 and/or a reseller 930 is purchasing a campaign at one or more physical locations, wherein the campaign spans a pre-determined period of time such as of two weeks and having a start and end times.

In like manner, the system 100 may facilitate identifying categories of promotional content based on related commercial features found in a digital image captured by the end user 900C.

Figure 9:
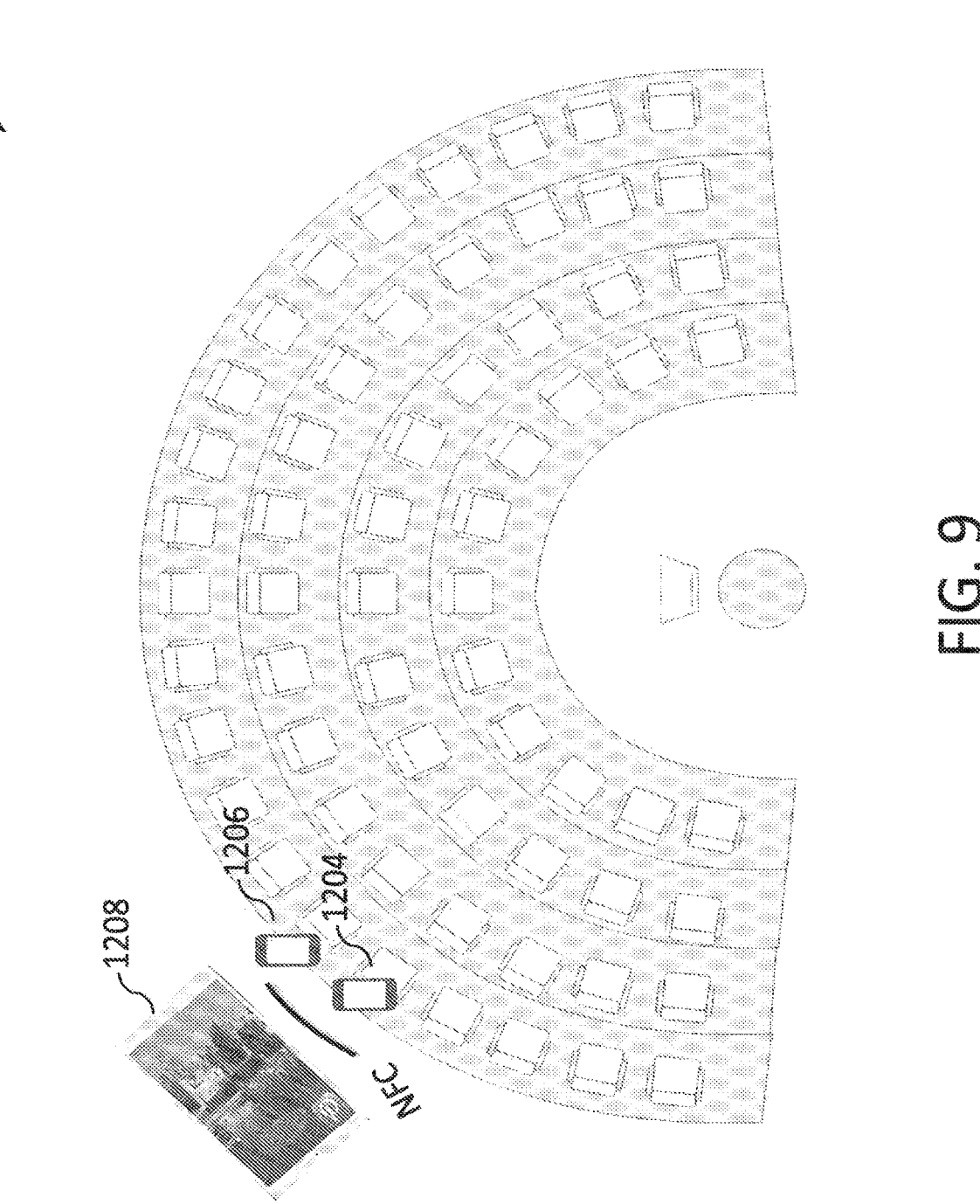
FIG. 9 is an illustration of an exemplary near field communications (NFC) session between two NFC enabled client terminals, under some embodiments of the present invention.

Referring now to FIG. 9 which is an illustration of an exemplary near field communications (NFC) session 114 between two NFC enabled client terminals, under some embodiments of the present invention.

Certain client terminals integrate NFC chips. NFC technology is generally used for short range communications between a plurality of end users and is grounded on radio frequency identification (RFID) technologies. The short range nature of this type wireless communications allows exchanging information between client terminals only over short distances, such as the distance depicted in FIG. 9.

Figure 10:
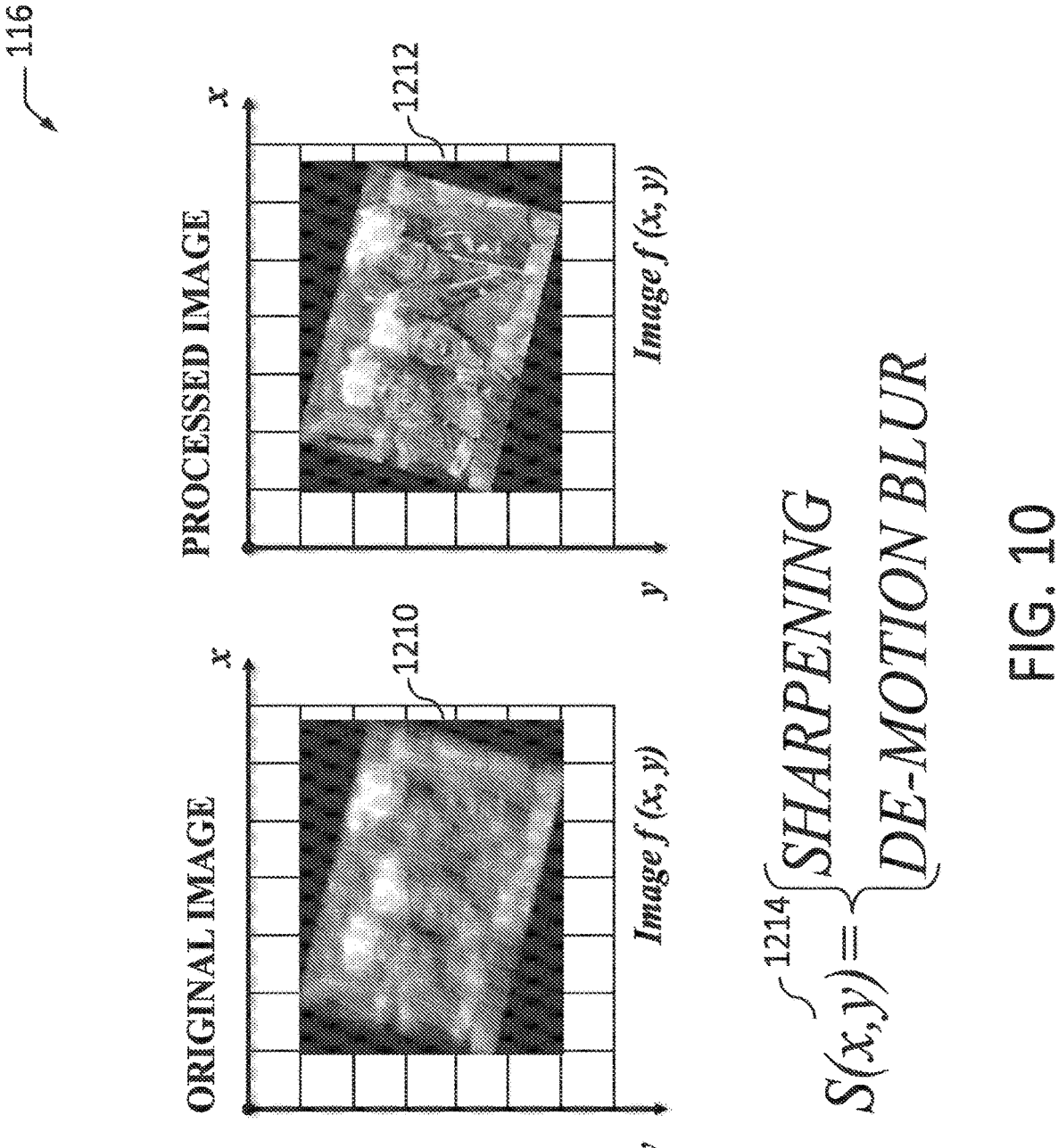
FIG. 10 is an illustration of a method for applying an image processing function to a digital image, according to some embodiments of the present invention.

The client terminal located at 1204 of a first end user establishes NFC with a second client terminal located at 1206 thereby allowing the first end user to transmit for instance, a resident application such as an image branding application 1208 to the second end user. Referring now to FIG. 10 which is an illustration of a method 116 for applying an image processing function to a digital image, according to some embodiments of the present invention.

An end user 900, by applying an image processing function selected, for instance from GUI component such as a graphical palette, may adjust a digital image after it was captured and branded, for instance, to improve the digital image sharpness, lighting, contrast and/or improve focus of one or more subjects. As known in the art, a digital image 1210 may be sharpened by applying an image processing function $S(x,y)$ 1214.

The image processing function $S(x,y)$ 1214 may transform the digital image spatial representation into an adapted frequency domain representation. The adapted frequency domain representation may be subsequently re transformed into the spatial domain while providing a sharpened version 1212 of the original digital image.

It should be noted that the image sharpening effect or any other effect represented by the image processing function $S(x,y)$ 1214, may be applied to the entire image or selectively applied to specific segments within the digital image 1210.

Under some embodiments of the present invention, the image processing function $S(x,y)$ 1214 is one or more of de blurring, color correction, auto focus, fill flash, cropping, de motion blurring, black and white, sepia, antique, overlay, pinch, zoom, Gaussian smoothing, rotation and/or the like.

Optionally, the image processing function $S(x,y)$ 1214 is a cascade of two or more image processing functions, as shown a de-blur function (sharpening) and a de-motion trail function, the later being useful in cases the end user was in motion while capturing the digital picture.

Optionally, the system 100 allows adjusting values of one or more parameters of the image processing function $S(x,y)$ 1214 automatically, semi automatically or manually performed by the end user 900. For instance, if the image processing function $S(x,y)$ 1214 is a Gaussian smoothing function then the end user alters the Kernel of 2 D Gaussian which affects the results of digital image smoothing.

Figure 11:
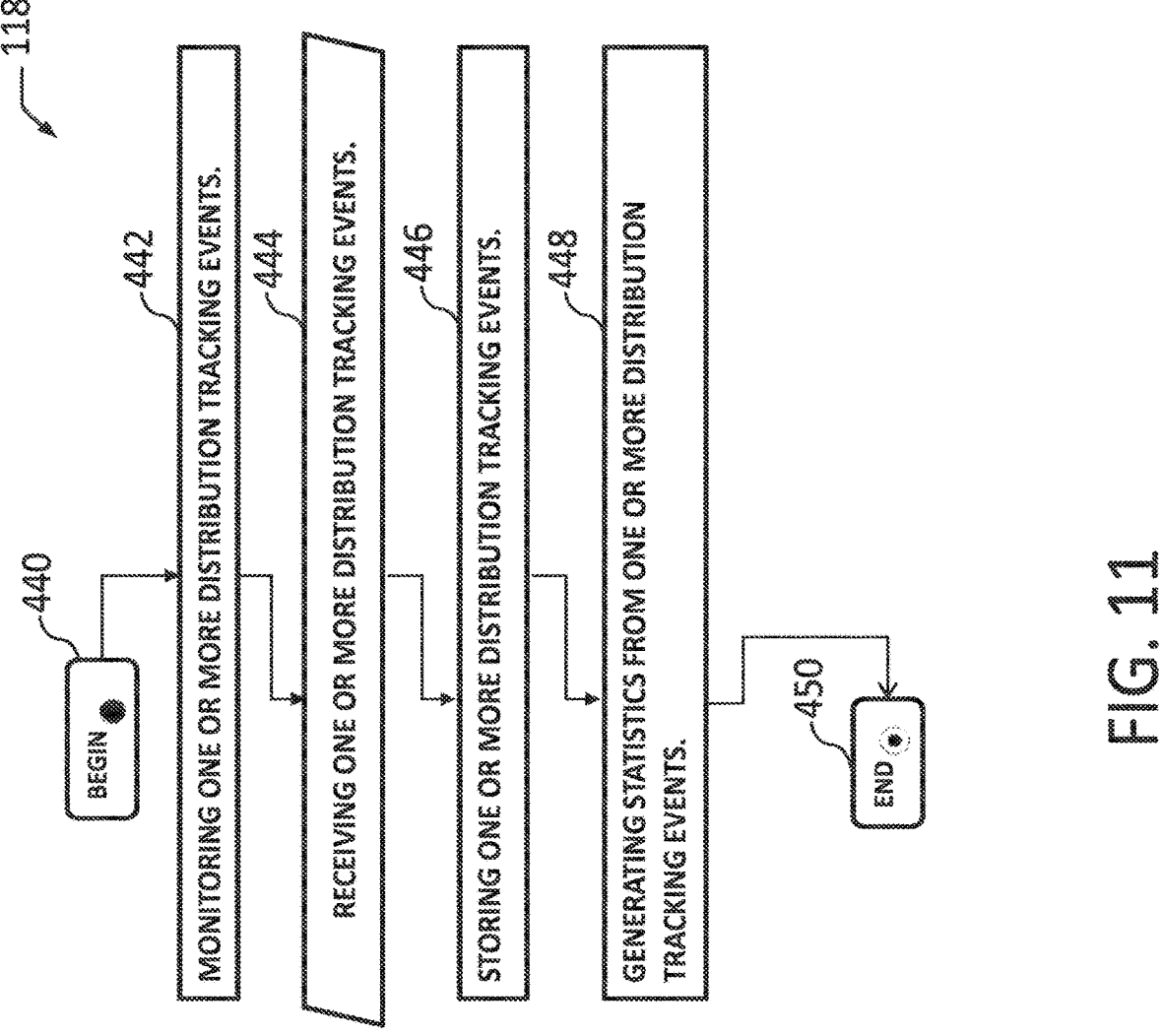
FIG. 11 is an illustration of a method for monitoring branded digital image distribution, according to some embodiments of the present invention.

Referring now to FIG. 11 which is an illustration of a method 118 for monitoring branded digital image distribution, according to some embodiments of the present invention.

As used herein, the term distribution tracking event refers to tracking event of distributing and sharing a digital image by an end user.

As noted hereinabove, the end user may share branded digital images across a wide array of social media networks. Tracking the distribution of these branded digital images may be useful in generating analytics on end user behavior, which are used to improve photo marketing campaigns.

Back to FIG. 11, first, the method begins at 440, followed at 442, by monitoring at least one distribution tracking event.

Next at 444, receiving at least one distribution tracking event. For instance, by triggering an event following a social media post of a digital image to a FaceBook group.

Next at 446, storing at least one distribution tracking event. Storing a history of tracking events may be found constructive in generating true statistics on end users and market trends based on a large sample of tracking events.

Next at 448, generating statistics from at least one distribution tracking event. The statistics may be presented to a brand manager which may use a campaign management web interface (refer for instance to numeral 912 of FIG. 2) having a GUI to view and analyze the results.

Lastly at 450, the method terminates.

Figure 13:
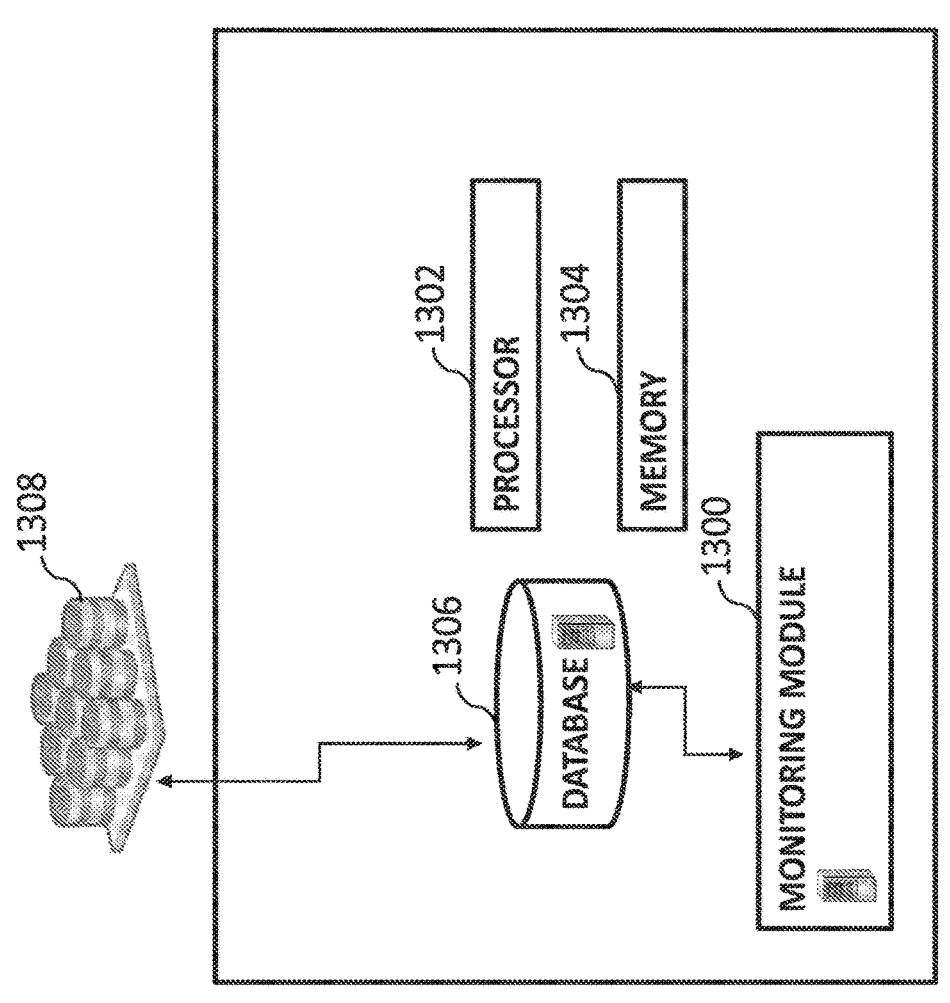
FIG. 13 is an exemplary event distribution monitoring system, according to some embodiments of the present invention.

A system that supports the implementation of the method depicted in FIG. 11, may be implemented under some embodiment of the present invention using the monitoring system of FIG. 13 which comprises: a monitoring module 1300 which receives, and processes using a processor 1302 and memory 1304, distribution tracking events which are stored on the database 1306.

The database 1306 may also utilize a large scale storage device, such as a hard disk array storage device 630 which is external to the system and used to store high volumes of data needed for monitoring a high number of distribution tracking events.

Figure 12:
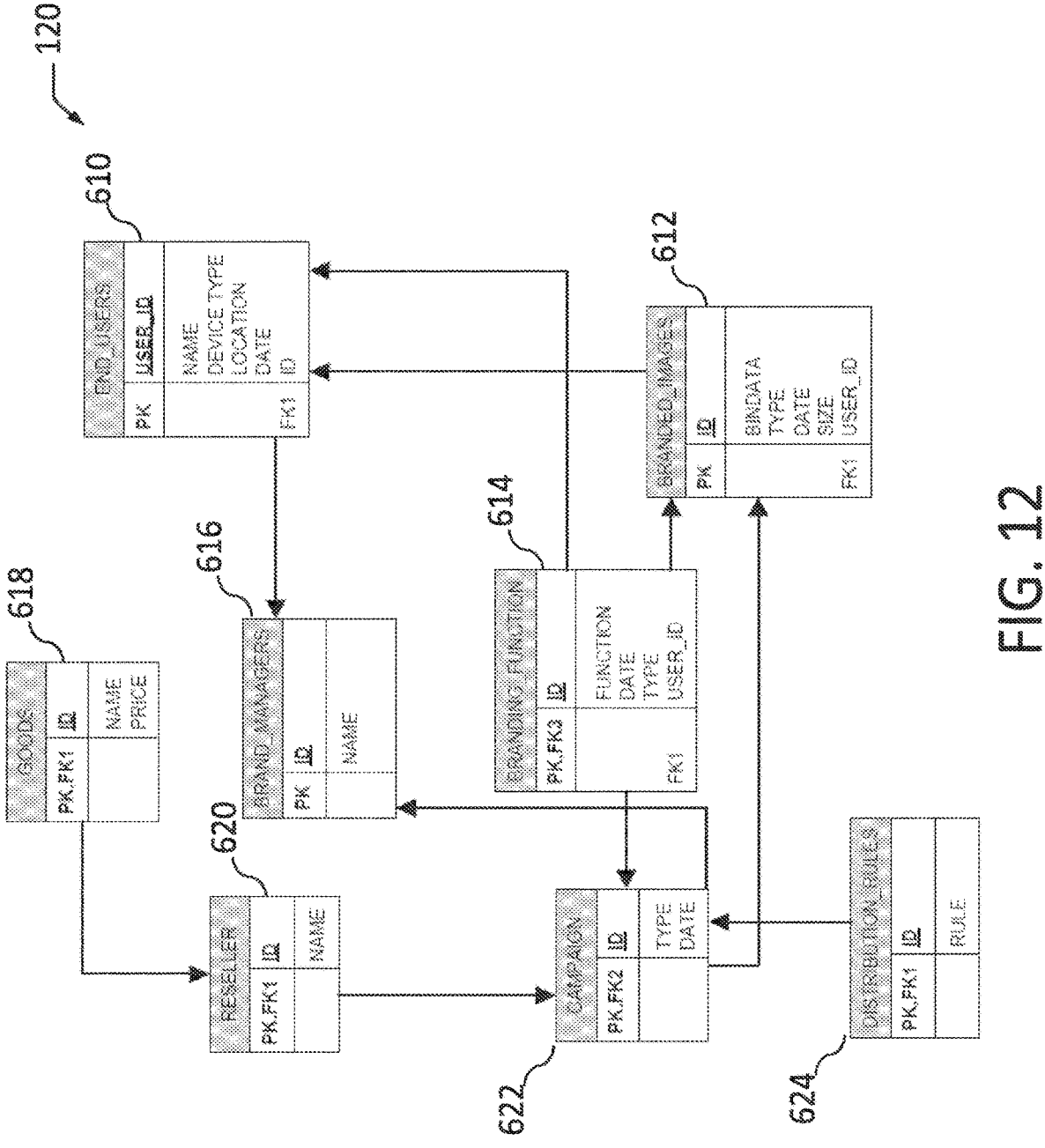
FIG. 12 is an exemplary entity relationship diagram (ERD) of a campaign management database managed by a system, according to some embodiments of the present invention.

Referring now to FIGS. 1, 12. FIG. 12 illustrates an exemplary entity relationship diagram (ERD) 104 of a campaign management database 600 managed by the system 100, according to some embodiments of the present invention.

As used herein, the term ERD refers to graphs depicting the links between tables in a relational database.

The campaign management database 600, which may be a database system, is used for storing and retrieving entries employed by the system 100. It should be noted, that in some embodiments of the present invention, several databases are used rather than a single database.

We now present by way of example only, and not limitation, the exemplary ERD of FIG. 12.

Table 610 stores information pertaining to end users partaking in a campaign, table 612 stores branded images, table 614 stores branding functions, table 616 stores information pertaining to brand managers managing a campaign, table 618 stores information about goods offered to end users, table 620 stores information pertaining to resellers, table 622 stores information about campaigns and table 624 stores information about distribution rules. In some embodiments of the present invention, the tables, their attributes and the relationships between the tables are as follows:

Table 610 describes and stores information about end users and comprising of the following attributes: a USER_ID used as a unique primary key to differentiate between table rows, a NAME used as the name of the end user, a DEVICE TYPE indicating the type of the client terminal the end user is using, a DATE indicating when the user started participating in a campaign and a LOCATION indicating the geo localized location of the end user.

Table 612 describes and stores branded digital images and comprising of the following attributes: an ID used as a unique primary key to differentiate between table rows, a BINDATA used as a binary container for the actual branded image, a TYPE indicating the type of the branded image, a DATE indicating when was the entry created and a SIZE indicating the size, in mega-bytes, of the branded image.

Table 614 describes and stores branding functions and comprising of the following attributes: an ID used as a unique primary key to differentiate between table rows, a FUNCTION which is the actual branding function definition, a TYPE indicating the type of the branding function, a DATE indicating when was the branding function created and USER_ID indicating to which users was the branding function distributed to. Tables 616-624 are designed and constructed in a similar fashion with similar attributes. It should be noted that not all relationships between the tables are depicted and that under some embodiments of the present invention other relationship permutations are possible.

Figure 15:
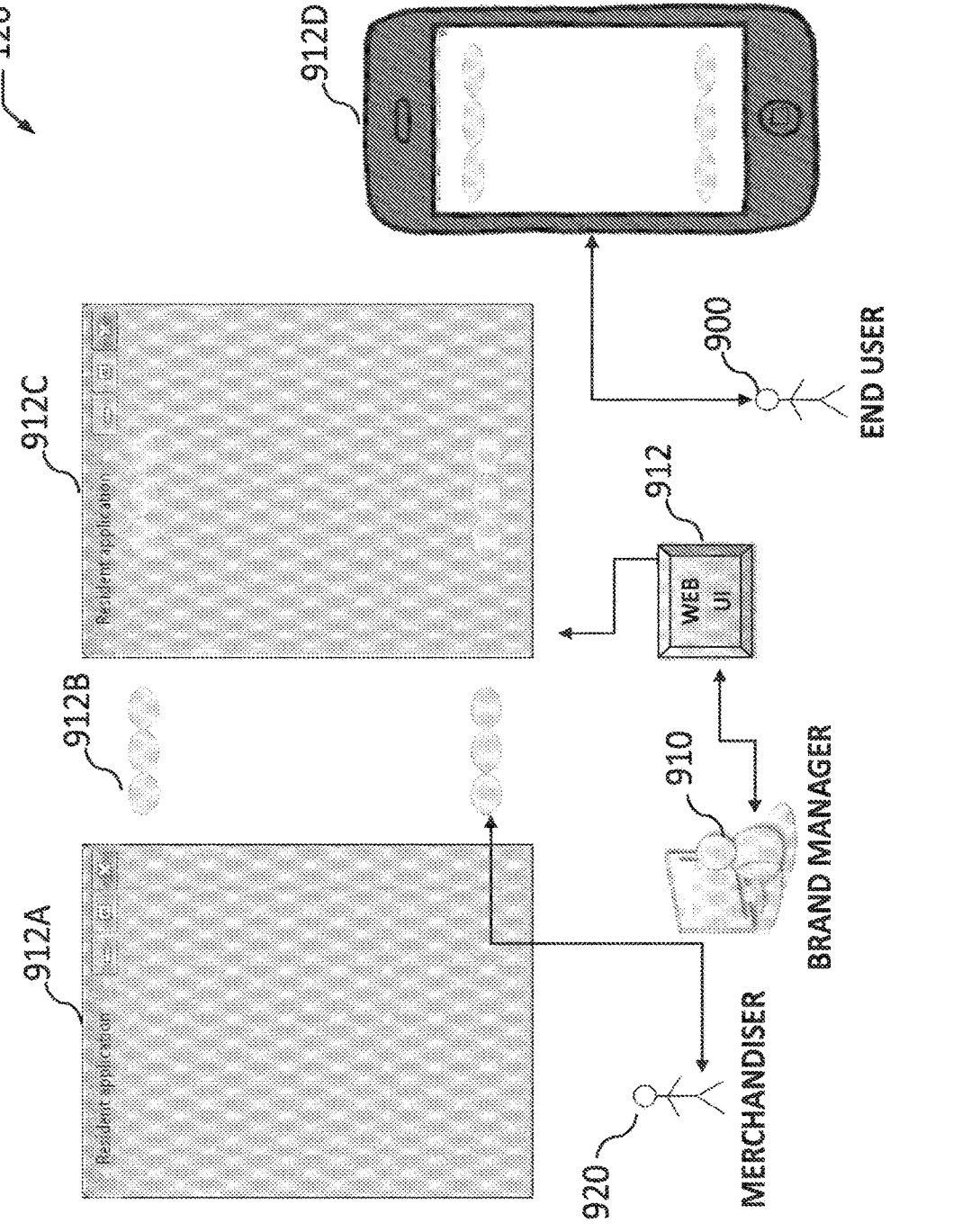
FIG. 15 is an illustration of an exemplary branded skin creation by a brand manager, according to some embodiments of the present invention.

Reference is now made to FIG. 15 which is an illustration of an exemplary creation of a branded skin by a brand manager, according to some embodiments of the present invention.

The concept of skin branding is as follows. The brand manager 910, using the campaign management web interface 912, may brand a skeleton resident application skin 912A. Subsequently, the end user 900 may install the resident application using the awareness process illustrated in FIG. 6.

First, the brand manager 910 using the campaign management web interface 912, has access to at least one skeleton resident application skin 912A.

Next, the brand manager 910 selects a resident application skin 912B which is overplayed on the skeleton resident application skin 912A resulting in a branded resident application skin 912C.

As shown the resident application skin 912B is an exemplary inflatable balloon skin associated with a merchandiser 920 of balloons.

EXAMPLES

Reference is now made to the following examples, which together with the above descriptions illustrate some embodiments of the invention in a non-limiting fashion.

Example 1

The present example describes an exemplary use-case outlining a photo-marketing campaign. The example is described with reference to FIGS. 1-3, FIG. 7 and FIGS. 13-14.

The example illustrates multiple physical locations and on-line elements in a campaign spanning a period of over two weeks.

1. Campaign Background

SM Marketing (SMM) is a successful marketing agency specializing in interactive, digital brand promotion. SMM has a number of food and beverage companies on its books including Dream Drinks (DD) that recently launched goods 618 such as EZ Vodka-a new lighter Vodka.

DD asked SMM for suggestions on how to generate traffic and attract end users 900 so that they visit the new EZ Vodka web page on social media network 800 such as Facebook. In addition, DD wanted to promote their brand across a number of specific geographic regions which previous market research has identified as offering high potential market penetration for EZ Vodka. The geographic regions may be regions such as the one depicted by numerals 1200 and 1202 of FIG. 8, and in this particular campaign include three US states—California, Florida and New Jersey, the United Kingdom and Spain.

SSM proposed a campaign 700 with an interactive end-user competition combined with free samples of EZ Vodka to be offered at selected nightclubs. The distribution rules 624 were stored in the campaign management database 600 by allowing a brand manager 910 to configure and store the actual distribution rules 636. For instance, a distribution rules reading "users who love vodka". The later distribution rule may be narrowed down by intersecting the rule with a rule reading "all residents of Spain" hence targeting only vodka lovers in Spain.

DD defined the following success criteria for the campaign: 25,000 "likes" on the new EZ Vodka Facebook page, 30,000 branded digital images 802F posted to various social media networks 800, 10,000 people submitting digital images to the competition 708 and 50,000 people voting for the winner. The success criteria may be attested using the monitoring system 13 which monitors events such as end users clicking a "like" button, calculates the number of branded images submitted, and aggregates voting results pertaining to the competition.

DD provided 400 free EZ Vodka shots (samples) at 10 preselected nightclubs in each of the three US states, the UK and Spain. A total of 80,000 free shots (representing about 3000 bottles of vodka) were provided on Friday and Saturday nights on two consecutive weekends.

The campaign 700 ran from the first Friday night over a period spanning 14 days while being monitored by the monitoring system 122. With an average attendance of 300 people at each venue, the campaign's total potential physical reach was 60,000 people. With a target of 30,000 branded images 612 posted to various social media networks, expected brand exposure was in excess of 1.5 million. An engagement rate of 3.4% or higher was required to generate the 50,000 target for competition participants.

The campaign included a competition 708—the winner of which receives a prize 708A in the form of monetary goods 706: two tickets, travel and hotel accommodation to Oslo's largest food and drink fair, taking place three months'time after the competition. DD provided both the free samples and the prize 708A; SSM was responsible conceptualizing and managing the campaign 710 including providing on-site attendants and signage at each nightclub. There was no further budget for any print or additional on-line promotion.

Except for providing the samples at a cost of $25,000, DD paid SSM a management fee of $80,000 and a further $8,000 to cover the cost of the prize 708A. The resulting total cost for the four active days at 50 different locations spread over three countries was $113,000—an all-inclusive average cost of $2,500 per venue per day.

2. Campaign Configuration

SSM, working on behalf of EZ Vodka, logged into system 100 using the campaign management website (refer for instance to numeral 912 of FIG. 2) and completed the following three steps each using an on-line wizard available on the campaign management web interface 912:

Step 1: Image and application branding. Exact locations of each nightclub were defined, as were the EZ Vodka image skins 802B and the EZ Vodka application branding 802E. The graphic artist preparing the image skins and application branding worked for 11 and completed the work within a week of DD approving the campaign (exact technical specifications were available on-line at the campaign management website). With the image skins and application branding material already prepared, the image configuration was completed within just a few minutes.

Step 2: Competition settings. The following required configuration for the competition:

On-line gallery branding

On-line gallery review permissions

On-line gallery access permissions

Voting procedure

Participant's tagging

Participant's caption editing

Winner announcement

Step 3: Social media settings

"Like" page configuration

Fixed footer configuration (text and hyperlink defined by EZ Vodka) that will always appear with the image wherever it is posted.

Participant's caption settings

Relevant social media networks defined facebook Album Name

E-mail subject and e-mail body message

3. Campaign Management 710. During the campaign both SSM and EZ Vodka managers 910 were able to access campaign data and make modifications to the campaign as required. One particular skin 802B proved to be extremely popular and so was promoted more aggressively. Had additional skins be needed or locations can be changed all this could have been done in real-time on-line. Images uploaded to the gallery were monitored, for instance by monitoring system 122 and if necessary, inappropriate or offensive images were removed.

4. Participant Experience. To receive a free sample of EZ Vodka, nightclub patrons had to download 802A, 802b the EZ Vodka branded resident application 310 for either the iPhone or Android platforms by scanning a Quick Response (QR) 802A code displayed prominently beside the free sample kiosk. Posters with instructions and details of the competition were displayed at the entrance to the nightclub, besides being displayed at the free sample kiosk and the entrance to the rest rooms.

Certain nightclubs did not permit at-the-door entry and only patrons who registered online were granted access. For these locations, patrons were encouraged to download the app 802A at the time of registration with details of the competition displayed as part of an on-line registration process. Whether or not the branded resident application 310 is downloaded ahead of time or on-site, patrons received a fully branded EZ Vodka app with no need to register as campaign users.

Once inside the nightclub club, patrons clicked away all night automatically receiving EZ Vodka branded images that could be shared on all the pre-selected social networks. In addition, patrons had the option of uploading one or more images to the EZ Vodka competition opening up the possibility of winning a trip for two to Oslo. Shared images were posted with a brief textual footer inviting social media friends to vote in the competition 708, the winner of which gets an all-expenses paid trip to Oslo. The footer also included a link to the EZ Vodka Facebook page. Voting was simple; the on-line gallery was open to everyone—both nightclub patrons and anyone who received a branded image through one of the preselected social media networks. Anyone wishing to vote viewed the gallery and simply double-clicked on the selected image vote. Only one vote was possible within a single browser session.

Stated differently, in order to vote multiple times, the end user had to close the browser and reload the page. No registration was required in order for the end user to vote. Voters were able to add comments to one or more pictures on the gallery by simply completing two fields-providing a name or alias and the comment itself. Just as SSM monitored posted images for suitability, comments were also monitored and removed if necessary.

All users that posted one or more images to the competition and shared that image through a social media network 800 received push notifications to their mobile devices 310 reminding them to get their friends to vote for them. Notifications were sent out 72, 48 and 24 hours prior to the end of the competition. Users were given a campaign-specific opt-out option should they wish not to receive any further notifications.

5. Campaign analytics. After the physical campaign was over the on-line competition remained open for five days. During the campaign and afterwards, SSM and DD managers were able to access campaign analytics by logging in to the campaign website.

Available data included the following:

User data: total number, daily breakdown and location breakdown.

Image data: number of branded images created—total, per location and per day, of number branded images uploaded to the competition, number of branded images uploaded to each social media network.

Competition data: number of images in the competition (including historical growth), total number of votes and vote breakdown.

Social Media: links/login pop-ups to the admin pages for each of the preselected social media networks for network-specific analytics.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant dynamic promotional layout and image processing functions management and/or distribution system will be developed and the scope of the term dynamic promotional layout and image processing functions management and/or distribution system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computerized method of utilizing a digital content processing function, the computerized method comprising:

employing by a computer system a sensor connected to a client terminal used by an end user to detect or measure current data metrics, wherein the computer system includes the client terminal or both the client terminal and a server and wherein the client terminal includes a display;

collecting by the computer system the current data metrics from the sensor and using by the computer system the current data metrics to determine a condition of the end user;

displaying by the computer system in a first area of the display, digital content wherein the digital content is digital content that has been captured, selected or generated by the end user;

utilizing by the computer system the collected current data metrics to modify the digital content processing function in response to the sensor detecting or measuring the condition of the end user;

presenting by the computer system in a second area of the display on the client terminal an indication of the modified digital content processing function;

receiving an input by the computer system indicating a selection by the end user, within the second area of the display, of the indication of the modified digital content processing function; and applying by the computer system the modified digital content processing function to at least one region of the digital content to create an output digital content, wherein the output digital content is a combination of the digital content and the modified digital content processing function.

2. A method according to claim 1, wherein the modified digital content processing function has a parameter adjusted based on the condition of the end user determined from the collected current data metrics, and wherein the applying of the modified digital content processing function with the adjusted parameter to the digital content causes a transformation of the digital content in at least one of color space, spatial arrangement, geometric layout, pixel characteristics, and overlay compositing.

3. A method according to claim 2, wherein the sensor includes a heart rate monitor, wherein the data metrics include heart rate monitor data, and wherein the condition of the end user relates to a heart rate of the end user.

4. A method according to claim 2, further comprising sharing by the computer system the output digital content to a second client terminal used by a second end user, wherein the shared output digital content appears on a second display of the second client terminal, wherein the computer system includes the first client terminal and the second client terminal or the first client terminal, the second client terminal and a server and wherein the first client terminal includes the first display and the second client terminal includes the second display.

5. A method according to claim 4, wherein the second end user using the second display of the second client terminal is provided with tools to comment on the shared output digital content and wherein the comment is at least one of a textual response and a non-textual interaction.

6. A method according to claim 2, wherein the second area of the display is the same as the first area of the display.

7. A method according to claim 2, further comprising receiving an input by the computer system indicating an adjustment by the end user, wherein the adjustment involves the identification of at least one region of interest within the digital content by the end user and selectively applying the digital content processing function to the region of interest.

8. A method according to claim 2, wherein the computer system includes one or more sensors connected to the client terminal and further comprising:

collecting by the computer system two types of current data metrics from the one or more sensors to determine the condition of the end user, wherein the condition of the end user relates to at least one of the location or movement of the client terminal, wherein the two types of data metrics include time data and location data-; and utilizing by the computer system the two types of current data metrics in combination to modify the digital content processing function, wherein the utilizing of the two types of current data metrics occurs when movement or location of the client terminal is detected or measured.

9. A method according to claim 2, wherein the applying of the modified digital content processing function with the adjusted parameter to the digital content generates output digital content in which a graphical overlay is inserted into a region of the digital content, the insertion comprising modifying pixel values within the region based on the overlay.

10. A method according to claim 9, wherein the applying of the modified digital content processing function with the adjusted parameter to the digital content is in real time or near real time.

11. A method according to claim 2, wherein the digital content processing function analyzes content depicted in the digital content.

12. A computerized method of utilizing a digital content processing function, the computerized method comprising:

employing by a computer system one or more sensors connected to a client terminal used by an end user to detect or measure a condition of the end user, wherein the computer system includes the client terminal or both the client terminal and a server, and wherein the client terminal includes a display;

collecting by the computer system one or more than one type of data metrics from the one or more sensors;

utilizing by the computer system the one or more than one type of data metrics collected from the one or more than one sensors to determine the condition of the end user;

utilizing by the computer system the collected data metrics to modify the digital content processing function, wherein the utilized data metrics are independent from data in digital content and wherein the digital content is captured, selected or generated by the end user;

presenting by the computer system an indication of the modified digital content processing function on the display of the client terminal;

receiving an input by the computer system indicating a selection by the end user of the indication of the modified digital content processing function; and applying by the computer system the modified digital content processing function to the digital content to create an output digital content, wherein the output digital content is a combination of the digital content and the modified digital content processing function.

13. A method according to claim 12, wherein the modified digital content processing function has a parameter adjusted based on the condition of the end user determined from the collected data metrics, and wherein the applying of the modified digital content processing function with the adjusted parameter to the digital content causes a transformation of the digital content in at least one of color space, spatial arrangement, geometric layout, pixel characteristics, and overlay compositing.

14. A method according to claim 13, further comprising:

sharing by the computer system the output digital content to a second client terminal used by a second end user, wherein the shared output digital content appears on a second display of the second client terminal, wherein the computer system includes the first client terminal and the second client terminal or the first client terminal, the second client terminal and a server and wherein the first client terminal includes the first display and the second client terminal includes the second display; and providing by the computer system tools to the second end user using the second client terminal to comment on the shared output digital content and wherein the comment is at least one of a textual response and a non-textual interaction.

15. A method according to claim 13, wherein the collecting of the one or more type of data metrics from the one or more sensors includes the collecting of current data metrics from the one or more sensors.

16. A computerized method of utilizing data metrics to dynamically change a digital content processing function, the computerized method comprising:

collecting by a computer system data metrics periodically from a sensor connected to a client terminal used by an end user, wherein the computer system includes the client terminal or both the client terminal and a server, wherein the client terminal includes a display, wherein digital content is displayed in the display, wherein the digital content is digital content that has been captured, selected or generated by the end user, wherein the sensor is employed in detecting a condition of the end user, and wherein the data metrics are related to the detected condition of the end user;

utilizing by the computer system the collected data metrics in order to modify the digital content processing function;

dynamically changing the modified digital content processing function by the computer system in response to a change in the collected data metrics;

presenting by the computer system in the display on the client terminal an indication of the dynamically changed digital content processing function;

receiving an input by the computer system indicating a selection by the end user of the indication of the dynamically changed digital content processing function; and applying the dynamically changed digital content processing function by the computer system to at least one region of the digital content to create an output digital content, wherein the output digital content is a combination of the digital content and the dynamically changed digital content processing function.

17. A method according to claim 16, wherein the dynamically changed digital content processing function has a parameter adjusted based on the condition of the end user determined from the collected data metrics, and wherein the applying of the dynamically changed digital content processing function with the adjusted parameter to the digital content causes a transformation of the digital content in at least one of color space, spatial arrangement, geometric layout, pixel characteristics, and overlay compositing.

18. A method according to claim 17, wherein the sensor includes a heart rate monitor, wherein the data metrics include heart rate monitor data, and wherein the condition of the end user relates to a heart rate of the end user.

19. A method according to claim 17, wherein the sensor includes a location determining module, wherein the periodically collected data metrics relate to at least one of movement and location, and wherein the condition of the end user relates to the location of the client terminal used by the end user.

20. A method according to claim 17, further comprising sharing by the computer system the output digital content to a second client terminal used by a second end user, wherein the shared output digital content appears on a second display of the second client terminal, wherein the computer system includes the first client terminal and the second client terminal or the first client terminal, the second client terminal and a server and wherein the first client terminal includes the first display and the second client terminal includes the second display.

21. A computerized method of utilizing a digital content processing function, the computerized method comprising:

employing by a computer system a sensor connected to a first client terminal used by a first end user to detect or measure data metrics, wherein the computer system includes the first client terminal and a second client terminal, and optionally a server, wherein the first client terminal includes a first display and a resident application and the second client terminal includes a second display;

receiving by the computer system the data metrics collected from the sensor and using by the computer system the data metrics to determine a condition of the first end user;

displaying by the computer system in a first area of the first display, digital content wherein the digital content is digital content that has been captured, selected or generated by the first end user;

in response to the receiving by the computer system of the data metrics, utilizing by the computer system the data metrics to modify the digital content processing function, wherein the digital content processing function has at least one parameter adjusted based on the condition of the first end user determined by the collected data metrics;

presenting by the computer system in a second area of the first display on the first client terminal an indication of the modified digital content processing function;

receiving an input by the computer system indicating a selection by the first end user, within the second area of the first display, of the indication of the modified digital content processing function;

applying by the computer system the modified digital content processing function to at least one region of the digital content to create an output digital content, wherein the output digital content is a combination of the digital content and the modified digital content processing function, and wherein the applying of the modified digital content processing function with the adjusted parameter to the digital content causes a transformation of the digital content in at least one of color space, spatial arrangement, geometric layout, pixel characteristics, and overlay compositing;

sharing by the computer system the output digital content to the second client terminal used by a second end user, wherein the shared output digital content appears on the second display of the second client terminal; and providing by the computer system tools on the second client terminal for the second end user to comment on the shared output digital content, and wherein the comment is at least one of a textual response and a non-textual interaction.

22. A method according to claim 21, wherein the data metrics are current data metrics.

23. A method according to claim 21, wherein the data metrics are independent of the data contained in the digital content.

24. A method according to claim 21, further comprising periodically collecting the data metrics from the sensor and dynamically changing at least one parameter of the the the digital content processing function in response to a change in the periodically collected data metrics.

25. A method according to claim 21, wherein the digital content is at least one of a graphical data, a photo, a drawing, a painting, a video file, images extracted from the video file, and an audio file.

26. A method according to claim 21, wherein the second area of the display is the same as the first area of the display.

27. A method according to claim 21, wherein the applying of the modified digital content processing function with the adjusted parameter to the digital content is in real time or near real time.

28. A method according to claim 21, wherein the applying of the modified digital content processing function with the adjusted parameter to the digital content generates output digital content in which a graphical overlay is inserted into a region of the digital content, the insertion comprising modifying pixel values within the region based on the overlay.

29. A method according to claim 21, wherein the modification of the digital content processing function utilizes in combination the data metrics collected from the sensor on the first client terminal and information pertaining to the first end user queried from a database, wherein the computer system includes one or more databases, and wherein the one or more databases store the digital content processing function and information pertaining to the first end user.

30. A method according to claim 21, further comprising receiving an input by the computer system indicating an adjustment by the end user, wherein the adjustment involves the identification of at least one region of interest within the digital content by the end user and selectively applying the digital content processing function to the region of interest.

\* \* \* \* \*